US012406399B2

(12) United States Patent
Zhu

(10) Patent No.: US 12,406,399 B2
(45) Date of Patent: Sep. 2, 2025

(54) POINT CLOUD PREDICTION PROCESSING METHODS AND APPARATUSES, COMPUTER, AND STORAGE MEDIUM

(71) Applicant: Tencent Technology (Shenzhen) Company Limited, Guangdong (CN)

(72) Inventor: Wenjie Zhu, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 196 days.

(21) Appl. No.: 18/236,279

(22) Filed: Aug. 21, 2023

(65) Prior Publication Data

US 2023/0394711 A1  Dec. 7, 2023

Related U.S. Application Data

(63) Continuation of application No. PCT/CN2022/135899, filed on Dec. 1, 2022.

(30) Foreign Application Priority Data

Mar. 11, 2022  (CN) .......................... 202210243498.9

(51) Int. Cl.
  *G06T 9/00*  (2006.01)
  *H04N 19/50*  (2014.01)
  (Continued)

(52) U.S. Cl.
  CPC .............. *G06T 9/00* (2013.01); *H04N 19/50* (2014.11); *H04N 19/60* (2014.11); *H04N 19/61* (2014.11)

(58) Field of Classification Search
  CPC ........... G06T 9/00; G06T 9/002; G06T 9/004; G06T 9/40; H04N 19/105; H04N 19/124;
  (Continued)

(56) References Cited

U.S. PATENT DOCUMENTS 11,423,642 B2 *  8/2022  Vosoughi ................ G06T 9/004
11,910,017 B2 *  2/2024  Zhu ....................... H04N 19/136
(Continued)

FOREIGN PATENT DOCUMENTS

| CN | 110418135 A | 11/2019 |
| CN | 112218079 A | 1/2021 |

OTHER PUBLICATIONS

International Search Report and Written Opinion received for PCT Patent Application No. PCT/CN2022/135899, mailed on Feb. 13, 2023, 13 pages (6 pages of English Translation and 7 pages of Original Document).

*Primary Examiner* — Vijay Shankar
(74) *Attorney, Agent, or Firm* — ARENTFOX SCHIFF LLP

(57) ABSTRACT

In a method for point cloud prediction processing, an alternative point set of a target point cloud group is obtained from M point cloud groups. The M point cloud groups include the target point cloud group. Coordinate code words of point cloud points in each of the M point cloud groups are identical after shifting by a grouping shift bit number corresponding to the respective point cloud group. Prediction reference points associated with a target point cloud point of the point cloud points in the target point cloud group are obtained from the alternative point set. The target point cloud point is predicted by processing circuitry based on the prediction reference points, to obtain a target predicted attribute value of the target point cloud point.

19 Claims, 6 Drawing Sheets

(51) Int. Cl.
*H04N 19/60* (2014.01)
*H04N 19/61* (2014.01)

(58) Field of Classification Search
CPC ........ H04N 19/48; H04N 19/50; H04N 19/61; H04N 19/60
See application file for complete search history.

(56) References Cited

U.S. PATENT DOCUMENTS

| | | | |
|---|---|---|---|
| 12,165,366 B2* | 12/2024 | Zhang | H04N 21/816 |
| 12,236,645 B2* | 2/2025 | Zheng | G06T 9/00 |
| 2024/0137579 A1* | 4/2024 | Zhang | H04N 19/96 |
| 2024/0289993 A1* | 8/2024 | Liang | G06T 9/004 |
| 2024/0314317 A1* | 9/2024 | Zhang | H04N 19/91 |
| 2025/0024040 A1* | 1/2025 | Yang | H04N 19/184 |

* cited by examiner

POINT CLOUD PREDICTION PROCESSING METHODS AND APPARATUSES, COMPUTER, AND STORAGE MEDIUM

RELATED APPLICATIONS

The present application is a continuation of International Application No. PCT/CN2022/135899 filed on Dec. 1, 2022, which claims priority to Chinese Patent Application No. 202210243498.9, filed on Mar. 11, 2022, and entitled "POINT CLOUD PREDICTION PROCESSING METHODS AND APPARATUSES, COMPUTER, AND STORAGE MEDIUM." The entire disclosures of the prior applications are hereby incorporated by reference.

FIELD OF THE TECHNOLOGY

This disclosure relates to the field of computer technologies, including to point cloud prediction processing methods and apparatuses, a computer, and a storage medium.

BACKGROUND OF THE DISCLOSURE

For different types of point cloud data, a current mainstream point cloud coding technology can be divided into point cloud coding based on a geometric structure and point cloud coding based on projection. In a process of point cloud coding, attribute prediction is performed on a point cloud. In an example, a size of an initial block is determined; a spatial structure of a current point is determined on the basis of the current point and the size of the initial block. In this spatial structure, neighboring points of the current point are obtained for attribute prediction. That is, the neighboring points are obtained on the basis of the current point (which can be referred to as a local point), which limits the obtaining of the neighboring points, thereby reducing the performance of point cloud attribute prediction.

SUMMARY

Embodiments of this disclosure provide point cloud prediction processing methods and apparatuses, a computer, and a non-transitory computer-readable storage medium.

One aspect of the embodiments of this disclosure provides a method for point cloud prediction processing. In the method for point cloud prediction processing, an alternative point set of a target point cloud group is obtained from M point cloud groups. The M point cloud groups include the target point cloud group. Coordinate code words of point cloud points in each of the M point cloud groups are identical after shifting by a grouping shift bit number corresponding to the respective point cloud group. Prediction reference points associated with a target point cloud point of the point cloud points in the target point cloud group are obtained from the alternative point set. The target point cloud point is predicted by processing circuitry based on the prediction reference points, to obtain a target predicted attribute value of the target point cloud point.

One aspect of the embodiments of this disclosure provides a method for point cloud prediction processing method. In the method for point cloud prediction processing, an alternative point set of a target point cloud group is obtained from M point cloud groups. The M point cloud groups include the target point cloud group. Coordinate code words of point cloud points in each of the M point cloud groups are identical after shifting by a grouping shift bit number corresponding to the respective point cloud group. Prediction reference points associated with a target point cloud point of the point cloud points in the target point cloud group are obtained from the alternative point set. The target point cloud point is predicted by processing circuitry based on the prediction reference points, to obtain a target predicted attribute value of the target point cloud point. A code stream corresponding to the target point cloud point is obtained. The code stream corresponding to the target point cloud point is decoded to obtain a target attribute residual of the target point cloud point. A target attribute reconstruction value of the target point cloud point is determined based on the target predicted attribute value and the target attribute residual.

One aspect of the embodiments of this disclosure provides a point cloud prediction processing apparatus. The apparatus includes processing circuitry that is configured to obtain an alternative point set of a target point cloud group from M point cloud groups. The M point cloud groups includes the target point cloud group. Coordinate code words of point cloud points in each of the M point cloud groups are identical after shifting by a grouping shift bit number corresponding to the respective point cloud group. The processing circuitry is configured to obtain prediction reference points associated with a target point cloud point of the point cloud points in the target point cloud group from the alternative point set. The processing circuitry is further configured to predict the target point cloud point based on the prediction reference points, to obtain a target predicted attribute value of the target point cloud point.

One aspect of the embodiments of this disclosure provides a point cloud prediction processing apparatus, including processing circuitry. The processing circuitry is configured to obtain an alternative point set of a target point cloud group from M point cloud groups. The M point cloud groups includes the target point cloud group. Coordinate code words of point cloud points in each of the M point cloud groups are identical after shifting by a grouping shift bit number corresponding to the respective point cloud group. The processing circuitry is configured to obtain prediction reference points associated with a target point cloud point of the point cloud points in the target point cloud group from the alternative point set. The processing circuitry is configured to predict the target point cloud point based on the prediction reference points, to obtain a target predicted attribute value of the target point cloud point. The processing circuitry is configured to obtain a code stream corresponding to the target point cloud point. The processing circuitry is configured to decode the code stream corresponding to the target point cloud point to obtain a target attribute residual of the target point cloud point. The processing circuitry is further configured to determine a target attribute reconstruction value of the target point cloud point based on the target predicted attribute value and the target attribute residual.

One aspect of the embodiments of this disclosure provides a computer device, including one or more processors, a memory, and an input/output interface.

The processors are connected to the memory and the input/output interface respectively; the input/output interface is used for receiving and outputting data; the memory is configured to store computer-readable instructions; and the processors is configured to invoke the computer-readable instructions to cause the computer device including the processors to implement any of the methods for point cloud prediction processing.

One aspect of the embodiments of this disclosure provides a non-transitory computer-readable storage medium. The non-transitory computer-readable storage medium stores instructions, which when executed by a processor cause the processor to implement any of the methods for point cloud prediction processing.

One aspect of the embodiments of this disclosure further provides a computer program product. The computer program product includes computer instructions stored in one or more computer-readable storage media. One or more processors of a computer device read the computer-readable instructions from the computer-readable storage media, and execute the computer-readable instructions, so that the computer device implements any of the methods for point cloud prediction processing. In other words, the computer-readable instructions, when executed by the processors, implement any of the methods for point cloud prediction processing.

Details of one or more embodiments of this disclosure are provided in the accompanying drawings and descriptions below. Other features, objectives, and advantages of this disclosure become apparent from the specification, the drawings, and the claims.

BRIEF DESCRIPTION OF THE DRAWINGS

To more clearly illustrate embodiments of this disclosure, the drawings used in the description of the embodiments are briefly introduced below. It is noted that the drawings in the description below are some embodiments of this disclosure, and other embodiments are within the scope of this disclosure.

DESCRIPTION OF EMBODIMENTS

Technical schemes in the embodiments of this disclosure will be more clearly described below with reference to the drawings in the embodiments of this disclosure. The described embodiments are only some of the embodiments of this disclosure. Other embodiments are within the scope of this disclosure.

This disclosure relates to the field of big data. Big data refers to data sets that cannot be captured, managed and processed by conventional software tools within a certain time range, and are massive, high-growth-rate and diversified information assets that have stronger decision-making power, insight discovery power and process optimization capability in a new processing mode. With the advent of cloud era, big data has attracted more and more attention. Big data requires special technology to effectively process a large amount of data within a tolerable elapsed time. Technologies suitable for big data include parallel processing databases, data mining, distributed file systems, distributed databases, cloud computing platforms, Internets, and extensible storage systems. For example, point cloud points can be grouped, predicted, coded, and decoded using a big data processing technology, a data computing technology, and the like in the field of big data, to improve the data processing efficiency.

Figure 1:
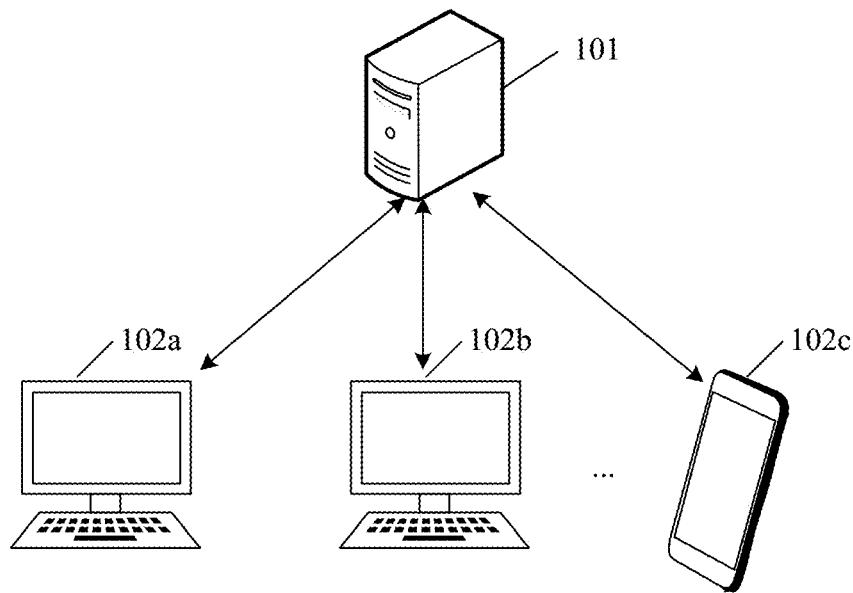
FIG. 1 is a network interaction architecture diagram of point cloud prediction processing according to an embodiment of this disclosure.

FIG. 1 is a network interaction architecture diagram of point cloud prediction processing according to an embodiment of this disclosure. A computer device 101 can obtain point cloud points that needs to be coded from the computer device 101, and code the obtained point cloud points, or, obtain a code stream that needs to be decoded from the computer device 101, and decode the obtained code stream. Or, a computer device 101 can obtain point cloud points that need to be coded from other associated devices, and code the obtained point cloud points, or, obtain a code stream that needs to be decoded from associated devices, and decode the obtained code stream. A quantity of the associated devices is one or at least two. For example, the quantity is 3 in FIG. 1, such as an associated 102a, an associated device 102b, an associated device 102c, or the like.

Figure 2:
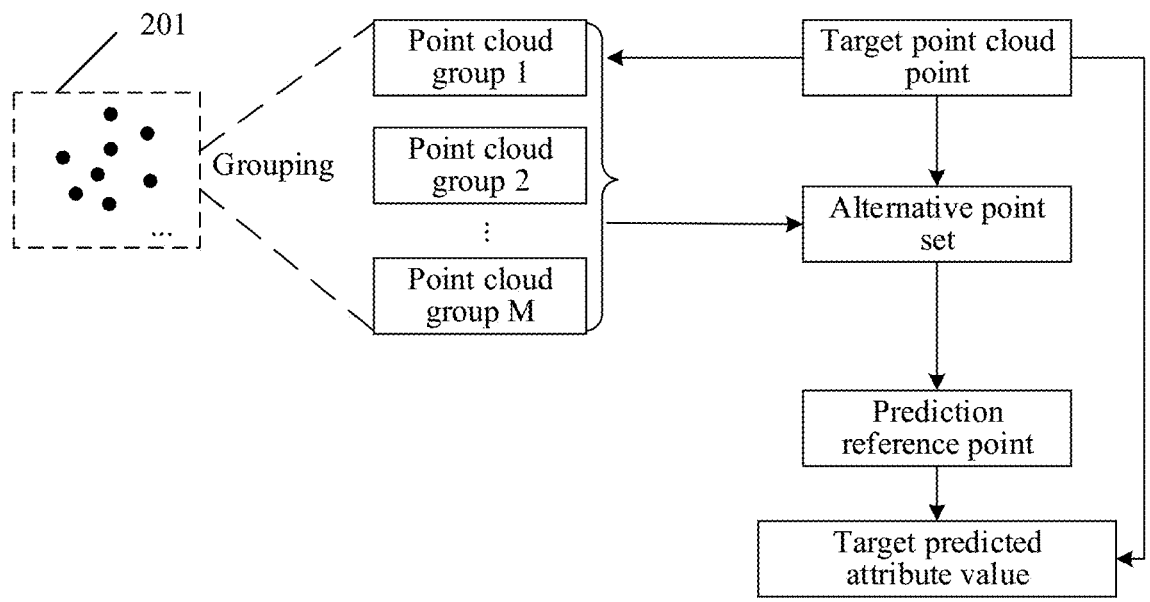
FIG. 2 is a schematic diagram of a point cloud prediction processing scenario according to an embodiment of this disclosure.

FIG. 2 is a schematic diagram of a point cloud prediction processing scenario according to an embodiment of this disclosure. As shown in FIG. 2, a computer device can obtain at least two point cloud points 201, and group the at least two point cloud points 201 on the basis of coordinate code words separately corresponding to the at least two point cloud points 201, to obtain M point cloud groups, where M is a positive integer. For example, in FIG. 2, M is a positive integer greater than or equal to 3, such as a point cloud group 1, a point cloud group 2, and a point cloud group M. The computer device can obtain a target point cloud group where a target point cloud point is located, and obtain an alternative point set corresponding to the target point cloud group. The computer device can obtain prediction reference points associated with the target point cloud point from the alternative point set. Further, the computer device can predict the target point cloud point on the basis of the prediction reference points, to obtain a target predicted attribute value of the target point cloud point. That is, during point cloud prediction, point cloud points that need to be coded will be grouped. When a certain point cloud point is predicted, an alternative point set of a point cloud group where the point cloud point that needs to be predicted may be obtained from service groups obtained by grouping. This takes a spatial correlation between various point cloud groups into account, so that attribute prediction performed on point cloud points may include some information about the spatial correlation between the groups, thereby improving the subsequent coding and decoding performance and efficiency.

It can be understood that the associated device mentioned in this embodiment of this disclosure may be a computer device, and the computer device in this embodiment of this disclosure includes but is not limited to a terminal device or a server. In other words, the computer device may be a server or a terminal device, or may be a system including a server and a terminal device. The terminal device mentioned above may be an electronic device, including but not limited to a mobile phone, a tablet computer, a desktop computer, a laptop computer, a palmtop, an on-board device, an augmented reality/virtual reality (AR/VR) device, a helmet-mounted display, a smart television, a wearable device, a smart speaker, a digital camera, a camera, and other mobile Internet device (MID) with a network access capability, or a terminal device in train, ship, flight and other scenarios. The above server may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, Intelligent Vehicle Infrastructure Cooperative Systems (IVICSs) Content Delivery Networks (CDNs), big data, and artificial intelligence platforms.

In one embodiment, data involved in this embodiment of this disclosure can be stored in the computer device, or the data may be stored on the basis of a cloud storage technology, which is not limited here.

Figure 3:
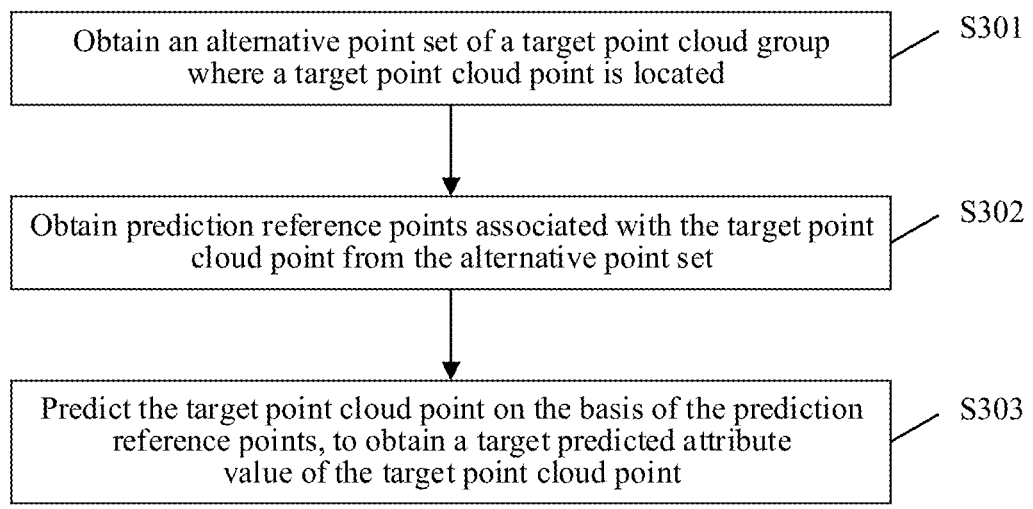
FIG. 3 is a flow chart of a point cloud prediction processing method in a coding process according to an embodiment of this disclosure.

FIG. 3 is a flow chart of a point cloud prediction processing method in a coding process according to an embodiment of this disclosure. As shown in FIG. 3, the point cloud prediction processing process includes the following steps:

In step S301, obtain an alternative point set of a target point cloud group where a target point cloud point is located.

In this embodiment of this disclosure, the alternative point set belongs to M point cloud groups, and the M point cloud groups include the target point cloud group, coordinate code words of point cloud points included in each point cloud group being identical after shifting by a grouping shift bit number corresponding to the point cloud group where the point cloud points are located; and M is a positive integer. The computer device may obtain the M point cloud groups obtained by grouping k point cloud points, where k is a positive integer. The computer device may obtain the alternative point set of the target point cloud group where the target point cloud point is located, that is, the alternative point set is intrinsically a point cloud group. There may be one or at least two alternative point sets. In one embodiment, the computer device may obtain a to-be-coded point cloud, and obtain k point cloud points constituting the to-be-coded point cloud; or, the computer device may obtain a space filling curve, and obtain k point cloud points included in the space filling curve. A specific obtaining manner of the k point cloud points that need to be coded is not limited here. The computer device may obtain k point cloud points and a coordinate code word corresponding to each point cloud point. Point cloud points with identical code word sequences obtained after shifting by a grouping shift bit number are taken as one group, thereby obtaining M point cloud groups. In one embodiment, the grouping shift bit number may be a fixed value or a variable. For example, the grouping shift bit number is denoted as L which may be a constant, namely, a fixed value, or may be a variable, namely, varying with grouping. L may be considered as a positive integer.

The coordinate code word of a $r^{th}$ point cloud point may be denoted as $H^r$. There is a hypothesis: a coordinate dimension number corresponding to the coordinate code word is dig; a code word length of the coordinate code word in each coordinate dimension is s; r is a positive integer less than or equal to k; dig and s are both positive integers. Thus, the coordinate code word of the $r^{th}$ point cloud point may be expressed as:

$$H^r = (coor\_1_{s-1}^r, coor\_2_{s-1}^r, \ldots, coor\_dig_{s-1}^r, coor\_1_{s-2}^r, \ldots, coor\_dig_{s-2}^r, \ldots, coor\_1_0^r, coor\_2_0^r, \ldots, coor\_dig_0^r)$$

where coor is used for representing a coordinate; "coor_1" is used for expressing a first coordinate dimension; "coor_dig" is used for expressing a $dig^{th}$ coordinate dimension; and the subscript is used for expressing a bit number of a code word corresponding to each coordinate dimension. For example, "s-1" represents a code at an $(s-1)^{th}$ bit in each coordinate dimension. That is, $(coor\_1_{s-1}^r, coor\_1_{s-2}^r, \ldots, coor\_1_0^r)$ form a code of the $r^{th}$ point cloud point in the first coordinate dimension, $(coor\_2_{s-1}^r, coor\_2_{s-2}^r, \ldots, coor\_2_0^r)$ form a code of the $r^{th}$ point cloud point in a second coordinate dimension, and the like. In one embodiment, it is assumed that dig is 3, including three coordinate dimensions x, y, and z, so that the coordinate code word of the $r^{th}$ point cloud point may be expressed as:

$$H^r = (x_{s-1}^r, y_{s-1}^r, z_{s-1}^r, x_{s-2}^r, y_{s-2}^r, z_{s-2}^r, \ldots, x_0^r, y_0^r, x_0^r),$$

where $(x_{s-1}^r, x_{s-2}^r, \ldots, x_0^r)$ form a code of the $r^{th}$ point cloud point in the coordinate dimension x; $(y_{s-1}^r, y_{s-2}^r, \ldots, y_0^r)$ form a code of the $r^{th}$ point cloud point in the coordinate dimension y; and $(z_{s-1}^r, z_{s-2}^r, \ldots, z_0^r)$ form a code of the $r^{th}$ point cloud point in the coordinate dimension z. In one embodiment, it is assumed that dig is 4, including three coordinate dimensions x, y, z, and t, so that the coordinate code word of the $r^{th}$ point cloud point may be expressed as $H^r = (x_{s-1}^r, y_{s-1}^r, z_{s-1}^r, t_{s-1}^r, x_{s-2}^r, y_{s-2}^r, z_{s-2}^r, t_{s-2}^r, \ldots, x_0^r, y_0^r, x_0^r, t_0^r)$; and the like.

Figure 4:
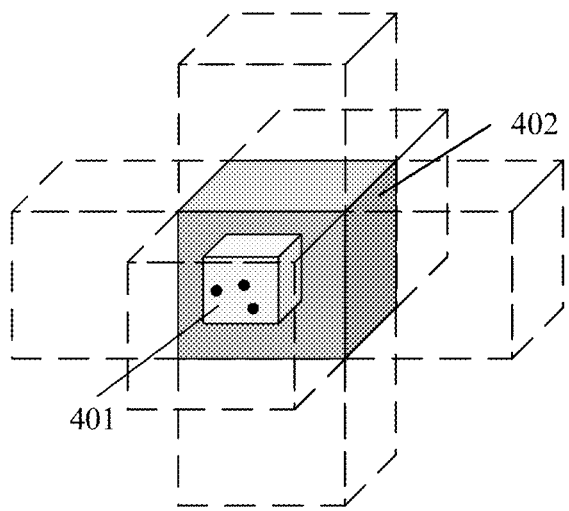
FIG. 4 is a schematic diagram of distribution of point cloud points according to an embodiment of this disclosure.

For example, FIG. 4 is a schematic diagram of distribution of point cloud points according to an embodiment of this disclosure. As shown in FIG. 4, the coordinate dimension number of 3 is taken as an example. A coordinate distribution of point cloud points is equivalent to a distribution of a three-dimensional space. For example, FIG. 4 shows three point cloud points which belong to one point cloud group 401. That is, the point cloud points located in the point cloud group 401 all belong to the point cloud group 401. After coordinate code words of the various point cloud points located in the point cloud group 401 are shifted, a code word range included in the point cloud group 401 may be obtained. That is, a range of the point cloud group 401 in FIG. 4 may represent a point cloud group sequence of the point cloud group 401.

In an example, all the grouping shift bit numbers separately corresponding to the M point cloud groups are default grouping shift bit numbers. That is, the grouping shift bit number may be a fixed value. The default grouping shift bit number may be based on an experience, or may be supplied by a user, or may be a historical grouping shift bit number. Shift grouping is performed by a fixed value, so that the basis for grouping of the coordinate code words of the various point cloud points is the same. In this case, the efficiency of grouping point cloud points and the efficiency of subsequently obtaining the alternative point set can be improved.

Or, the grouping shift bit number may be a variable. In an example, in a case that a mean value of quantities of point cloud points respectively contained in $M_1$ neighboring point cloud groups adjacent to the target point cloud group is greater than a first point quantity threshold, the grouping shift bit number corresponding to the target point cloud group is less than the grouping shift bit numbers separately corresponding to the $M_1$ neighboring point cloud groups; in a case that a mean value of quantities of point cloud points respectively contained in $M_1$ neighboring point cloud groups adjacent to the target point cloud group is less than a second point quantity threshold, the grouping shift bit number corresponding to the target point cloud group is greater than the grouping shift bit numbers separately corresponding to the $M_1$ neighboring point cloud groups; $M_1$ is a positive integer less than M; and in a case that a mean value of quantities of point cloud points respectively contained in $M_1$ neighboring point cloud groups adjacent to the target point cloud group is greater than or equal to a second point quantity threshold, and less than or equal to a first point quantity threshold, the grouping shift bit number of the target point cloud group is equal to the grouping shift bit number of the previous point cloud group of the target point cloud group. That is, when the quantities of the point cloud points contained in the neighboring point cloud groups are too large, the grouping shift bit number can be decreased to reduce quantities of point cloud points contained in subsequently generated point cloud groups. When the quantities of the point cloud points contained in the neighboring point cloud groups are too small, the grouping shift bit number can be increased to increase quantities of point cloud points contained in subsequently generated point cloud groups. The quantities of the point cloud points contained in the various point cloud groups can be balanced as much as possible, to improve the grouping effect of point cloud groups.

In one embodiment, the M point cloud groups may include one or at least two inter-group sets. The grouping shift bit numbers of the point cloud groups included in the same inter-group set are identical, and the grouping shift bit numbers of the point cloud groups in different inter-group sets are different. A quantity of the point cloud groups included in one inter-group set is less than or equal to a grouping unit threshold. In addition, in a case that the mean value of the quantities of the point cloud points respectively contained in the $M_1$ neighboring point cloud groups adjacent to a first point cloud group in a $j^{th}$ inter-group set is greater than the first point quantity threshold, the grouping shift bit number of the point cloud groups included in the $j^{th}$ inter-group set is less than the grouping shift bit numbers separately corresponding to the $M_1$ neighboring point cloud groups. In a case that the mean value of the quantities of the point cloud points respectively contained in the $M_1$ neighboring point cloud groups adjacent to the first point cloud group in the $j^{th}$ inter-group set is greater than the second point quantity threshold, the grouping shift bit number of the point cloud groups included in the $j^{th}$ inter-group set is greater than the grouping shift bit numbers separately corresponding to the $M_1$ neighboring point cloud groups. In a case that the mean value of the quantities of the point cloud points respectively contained in the $M_1$ neighboring point cloud groups adjacent to the first point cloud group in the $j^{th}$ inter-group set is greater than or equal to the second point quantity threshold, and less than or equal to the first point quantity threshold, the grouping shift bit number of the point cloud groups included in the $j^{th}$ inter-group set may be identical with the grouping shift bit number of the previous inter-group set of the $j^{th}$ inter-group set. The grouping shift bit number can be changed, to improve the distribution balance of the grouped point cloud points. Meanwhile, the number of times of changing a grouping shift bit number is limited. That is, a grouping shift bit number is updated once the grouping unit threshold of point cloud groups are obtained, which reduces the amount of data that need to be processed. For example, it is assumed that the grouping unit threshold is 5, and a grouping shift bit number is obtained. A first point cloud group to a fifth point cloud group are obtained on the basis of the grouping shift bit number. The mean value of the quantities of the point cloud points contained in the $M_1$ neighboring point cloud groups of a next point cloud point of the fifth point cloud group is obtained. The grouping shift bit number is updated on the basis of the mean value of the quantities. A sixth point cloud group to a tenth point cloud group are obtained on the basis of the updated grouping shift bit number, till the k point cloud points are all grouped. In one embodiment, an inter-group set may be a concept for describing changes of a grouping shift bit number.

In one embodiment, when the alternative point set of the target point cloud group is obtained from the M point cloud groups, in one alternative point set obtaining manner, the alternative point set includes point cloud groups, located in front of the target point cloud group and adjacent to the target point cloud group, among the M point cloud groups. A total quantity of point cloud points included in the alternative point set is less than or equal to a third point quantity threshold. In one embodiment, the third point quantity threshold may be denoted as maxNumofNeighbor. In an example, the computer device may obtain, by using the target point cloud group as a baseline group, point cloud groups in sequence from the M point cloud groups until the alternative point set is obtained. The total quantity of point cloud points in point cloud groups corresponding to the alternative point set is less than or equal to the third point quantity threshold, and a sum of the quantities of the point cloud points included in the alternative point set and the point cloud groups located in front of the alternative point set is greater than the third point quantity threshold. For example, there is (a point cloud group 1, a point cloud group 2, a point cloud group 3, . . . , and a point cloud group M). Assuming that the target point cloud group is the point cloud group 5 and that the third point quantity threshold is 10, the target point cloud group is taken as the baseline group, the point cloud group 4 is obtained in sequence. It is assumed that the point cloud group 4 includes three point cloud points. The third point quantity threshold is greater than 3. The point cloud group 3 is continued to be obtained. It is assumed that the point cloud group 3 includes five point cloud points. At this time, the point cloud group 4 and the point cloud group 3 include a total of eight point cloud points. The third point quantity threshold is greater than 8. The point cloud group 2 is continued to be obtained. It is assumed that the point cloud group 2 includes four point cloud points. At this time, the point cloud group 4, the point cloud group 3, and the point cloud group 2 include a total of 12 point cloud points. The third point quantity threshold is greater than 12. The point cloud group 4 and the point cloud group 3 are determined as the alternative point sets of the target point cloud group.

In the above embodiment, at least one point cloud group, located in front of the target point cloud group and adjacent to the target point cloud group, among the M point cloud groups is used as the alternative point set, so that the accuracy of point cloud prediction can be further improved.

In one alternative point set obtaining manner, point cloud groups, located in front of the target point cloud group, among the M point cloud groups are the alternative point sets. A quantity of point cloud points included in each alternative point set is greater than or equal to an in-group point quantity threshold. In one embodiment, a quantity of alternative point sets is less than or equal to a group quantity selection threshold. In an example, the computer device may take the target point cloud group as the baseline group and obtain candidate point cloud groups from the M point cloud groups in sequence. A quantity of point cloud points included in each candidate point cloud group is greater than or equal to the in-group point quantity threshold. When the M point cloud groups have been completely traversed, the obtained candidate point cloud groups are determined as the alternative point sets of the target point cloud group. For example, there is (a point cloud group 1, a point cloud group 2, a point cloud group 3, . . . , and a point cloud group M). Assuming that the in-group point quantity threshold is 4, and that the target point cloud group is the point cloud group 5. Assuming that a quantity of point cloud points included in each of the point cloud group 1, the point cloud group 2, and the point cloud group 3 is greater than or equal to four, the point cloud group 1, the point cloud group 2, and the point cloud group 3 are determined as the alternative point sets of the target point cloud group. Or, the computer device may take the target point cloud group as the baseline group and obtain candidate point cloud groups from the M point cloud groups in sequence. A quantity of point cloud points included in each candidate point cloud group is greater than or equal to the in-group point quantity threshold. When a quantity of the candidate point cloud groups is the group quantity selection threshold, or when the M point cloud groups have been completely traversed, the obtained candidate point cloud groups are determined as the alternative point sets of the target point cloud group. For example, there is (a point cloud group 1, a point cloud group 2, a point cloud group 3, . . . , and a point cloud group M). It is assumed that the in-group point quantity threshold is 4, that the target point cloud group is the point cloud group 5, and that the group quantity selection threshold is two. It is assumed that the point cloud group 4 includes three point cloud points. The in-group point quantity threshold is greater than three. Assuming that the point cloud group 3 includes five point cloud points, and the in-group point quantity threshold is less than 5. The point cloud group 3 is determined as a candidate point cloud group. At this point, there is one candidate point cloud group, and the group quantity selection threshold is greater than 1. It is assumed that the point cloud group 2 includes four point cloud points. The in-group point quantity threshold is equal to 4, and the point cloud group 2 is determined as a candidate point cloud group. At this time, there are two candidate point cloud groups, and the group quantity selection threshold is two. The point cloud group 2 and the point cloud group 3 are determined as the alternative point sets of the target point cloud group.

In the above embodiment, the point cloud groups, located in front of the target point cloud group and containing the point cloud points with the quantities greater than or equal to the in-group point quantity threshold, among the M point cloud groups are used as the alternative point sets, which can further improve the accuracy of point cloud prediction.

In one alternative point set obtaining manner, N point cloud groups, located in front of the target point cloud group, among the M point cloud groups are the alternative point sets. N is a positive integer, and N is a default neighboring group threshold. The default neighboring group threshold is a quantity threshold of point cloud groups located in front of the target point cloud group and adjacent to the target point cloud group. In an example, the computer device may use the target point cloud group as a baseline group, and obtain N point cloud groups from M point cloud groups. The obtained N point cloud groups are determined as alternative point sets of the target point cloud group. For example, assuming that the default neighboring group threshold is 3, and the target point cloud group is the point cloud group 5, the point cloud group 5 is used as the baseline group to obtain three point cloud groups in sequence, namely, a point cloud group 4, a point cloud group 3, and a point cloud group 2. The point cloud group 4, the point cloud group 3, and the point cloud group 2 are determined as the alternative point sets of the target point cloud group.

In the above embodiment, the N point cloud groups, located in front of the target point cloud group and adjacent to the target point cloud group, among the M point cloud groups are used as the alternative point sets, so that the accuracy of point cloud prediction can be further improved. In one alternative point set obtaining manner, one point cloud group corresponds to one point cloud group sequence. The point cloud group sequence is obtained after shifting, according to the grouping shift bit number of the corresponding point cloud group, the coordinate code words of the point cloud points included in the corresponding point cloud group. For example, the above $r^{th}$ point cloud point is taken as an example. Assuming that the grouping shift bit number of the point cloud group where the $r^{th}$ point cloud point is located is dig, the code word sequence obtained after the $r^{th}$ point cloud point is shifted can be denoted as:

$$(\text{coor\_1}_{s-1}{}^r, \text{coor\_2}_{s-1}{}^r, \ldots, \text{coor\_dig}_{s-1}{}^r, \\ \text{coor\_1}_{s-2}{}^r, \ldots, \text{coor\_dig}_{s-2}{}^r, \ldots, \text{coor\_1}_1{}^r, \\ \text{coor\_2}_1{}^r, \ldots, \text{coor\_dig}_1{}^r),$$

that is, after shifting by the grouping shift bit number, the coordinate code words of all the point cloud points in the point cloud group where the $r^{th}$ point cloud point is located are all identical with the code word sequence obtained after the coordinate code word of the $r^{th}$ point cloud point is shifted.

In a case that a target grouping shift bit number corresponding to the target point cloud group is a multiple of a coordinate dimension number, an alternative shift sequence obtained after an alternative point cloud group sequence corresponding to the alternative point set is shifted by a first multiple of the coordinate dimension number is identical with a target shift sequence obtained after a target point cloud group sequence corresponding to the target point cloud group is shifted by the first multiple of the coordinate dimension number. The coordinate dimension number refers to a quantity of dimensions corresponding to the coordinate code words of the point cloud points included in each point cloud group, namely, a quantity of coordinate dimensions corresponding to the coordinate code words. For example, when the target grouping shift bit number is L=dig*v, v being a positive integer, the target point cloud group sequence corresponding to the target point cloud group is denoted as $H_{K1}$, and the target point cloud group is denoted as K1. The target point cloud group sequence $H_{K1}$ is shifted by the first multiple of the coordinate dimension number, denoted as $H_{K1} >> \text{dig}*\text{mul}_1$, to obtain a point cloud group that satisfies $H_{K2} >> \text{dig}*\text{mul}_1 = H_{K1} >> \text{dig}*\text{mul}_1$, that is, a shift sequence obtained after the point cloud group sequence of the point cloud group is shifted by the first multiple of the coordinate dimension number is identical with a target shift sequence obtained after the target point cloud group sequence corresponding to the target point cloud group is shifted by the first multiple of the coordinate dimension number. The obtained point cloud group is determined as the alternative point set of the target point cloud group, where $\text{mul}_1$ is used for representing the first multiple, and mul1 is a positive integer. For example, assuming that the coordinate dimension number dig is 3, the above process can be represented as obtaining $H_{K2} >> 3 = H_{K1} >> 3$ in a case of L=3v. The point cloud group K2 is an alternative point set of the point cloud group K1. It can be considered that the point cloud group K2 is a neighboring node of a parent node where the point cloud group K1 is located. Or, in a case of $H_{K2}>>6=H_{K1}>>6$, 6 is twice 3, and the point cloud group K2 is an alternative point set of the point cloud group K1.

In the above embodiment, in a case that the target grouping shift bit number corresponding to the target point cloud group is a multiple of the coordinate dimension number, the alternative shift sequence obtained after the alternative point cloud group sequence corresponding to the alternative point set is shifted by the first multiple of the coordinate dimension number is identical with the target shift sequence obtained after the target point cloud group sequence corresponding to the target point cloud group is shifted by the first multiple of the coordinate dimension number. In this way, the accuracy of point cloud prediction can be further improved.

In a case that a target grouping shift bit number corresponding to the target point cloud group is not a multiple of the coordinate dimension number, an alternative shift sequence obtained after an alternative point cloud group sequence corresponding to the alternative point set is shifted by a supplementary dimension number is identical with a target shift sequence obtained after a target point cloud group sequence corresponding to the target point cloud group is shifted by the supplementary dimension number. The supplementary dimension number refers to a bit number difference value between a reminder and the coordinate dimension number, and the reminder refers to a reminder between the target grouping shift bit number and the coordinate dimension number. Or, the supplementary dimension number refers to a sum of the bit number difference value and a second multiple of the coordinate dimension number. The second multiple may be denoted as $mul_2$, and $mul_2$ is a positive integer. For example, when the target grouping shift bit number is $L=dig*v-(dig-1)$, v being a positive integer, the target point cloud group sequence corresponding to the target point cloud group is denoted as $H_{K1}$, and the target point cloud group is denoted as the point cloud group K1. At this time, the supplementary dimension number is (dig−1) or $\{(dig-1)+dig*mul_2\}$ to obtain a point cloud group that satisfies $H_{K2}>>(dig-1)=H_{K1}>>(dig-1)$, or to obtain a point cloud group that satisfies $H_{K2}>>\{(dig-1)+dig*mul_2\}=H_{K1}>>\{(dig-1)+dig*mul_2\}$. The obtained point cloud group K2 is determined as an alternative point set of the target point cloud group. When the target grouping shift bit number is $L=dig*v-(dig-2)$. At this time, the supplementary dimension number is (dig−2) or $\{(dig-2)+dig*mul_2\}$ to obtain a point cloud group that satisfies $H_{K2}>>(dig-2)=H_{K1}>>(dig-2)$, or to obtain a point cloud group that satisfies $H_{K2}>>\{(dig-2)+dig*mul_2\}=H_{K1}>>\{(dig-2)+dig*mul_2\}$. The obtained point cloud group K2 is determined as an alternative point set of the target point cloud group . . . ; and when the target grouping shift bit number is $L=dig*v-1$, at this time, the supplementary dimension number is 1 to obtain a point cloud group that satisfies $H_{K2}>>1=H_{K1}>>1$, or to obtain a point cloud group that satisfies $H_{K2}>>\{1+dig*mul_2\}=H_{K1}>>\{1+dig*mul_2\}$. The obtained point cloud group K2 is determined as an alternative point set of the target point cloud group. At this point, the point cloud group K2 may be considered as a neighboring node of the point cloud group K1. For example, assuming that the coordinate dimension number dig is 3 and that the target grouping shift digit number L is 2, the supplementary dimension number may be 1, (1+3=4), or the like. For example, when $H_{K2}22>1=H_{K1}>>1$ is satisfied, it can be considered that the point cloud group K2 is an alternative point set of the point cloud group K. Or, when $H_{K2}>>4=H_{K1}>>4$ is satisfied, it can be considered that the point cloud group K2 is an alternative point set of the point cloud group K1, where ">>" represents shift. For example, assuming that $H_{K1}$ is 001101, 00110 is obtained after $H_{K1}>>1$.

In the above embodiment, in a case that the target grouping shift bit number corresponding to the target point cloud group is a multiple of the coordinate dimension number, the alternative shift sequence obtained after the alternative point cloud group sequence corresponding to the alternative point set is shifted by the first multiple of the coordinate dimension number is identical with the target shift sequence obtained after the target point cloud group sequence corresponding to the target point cloud group is shifted by the first multiple of the coordinate dimension number. In this way, the accuracy of point cloud prediction can be further improved.

As shown in FIG. 4, assuming that the target point cloud group is the point cloud group 401. After two shifts, the obtained target shift sequence can be shown in a region 402, and a point cloud group located in this region 402 can be determined as an alternative point set of the point cloud group 401. That is, the region 402 can be considered as a parent node of the point cloud group 401. In one embodiment, the region 402 also includes six coplanar neighboring nodes, as indicated by a dashed box in FIG. 4. The region may also include 12 colinear neighboring nodes and eight concurrent neighboring nodes. In one embodiment, the computer device may obtain, on the basis of a requirement, an alternative point set of the target point cloud group from the coplanar, collinear, or concurrent neighboring nodes of the parent node of the target point cloud group. In some examples, a quantity of the coplanar neighboring node, a quantity of the collinear neighboring node, and a quantity of the coplanar neighboring node are determined by the coordinate dimension number dig, which will not be limited here. In one embodiment, the process of obtaining the alternative point set may be achieved through any one or a combination of the aforementioned alternative point set obtaining manners.

In step S302, prediction reference points associated with the target point cloud point are obtained from the alternative point set.

In this embodiment of this disclosure, the computer device may obtain the prediction reference points associated with the target point cloud point from the alternative point set. There is one or at least two alternative point sets. When there is one alternative point set, point cloud points included in the alternative point set may be directly determined as the prediction reference points associated with the target point cloud point. Or, the computer device may obtain point-to-point distances between the point cloud points included in the alternative point set and the target point cloud point, and obtain, on the basis of the point-to-point distances between the point cloud points included in the alternative point set and the target point cloud point, the prediction reference points associated with the target point cloud point from the alternative point set. A point-to-point distance may be a distance between a coordinate of a point cloud point included in the alternative point set and a coordinate of the target point cloud point, or may be referred to as a geometrical distance, or may be a quantity of dot spacers between a point cloud point included in the alternative point set and the target point cloud point in the M point cloud groups.

There are at least two alternative point sets. In an example, in one prediction reference point obtaining manner, the computer device may select d point cloud points respectively from the at least two alternative point sets, and determine the d point cloud points separately corresponding to the at least two alternative point sets as prediction reference points associated with the target point cloud point; and d is a positive integer. For example, assuming that d is 1, one point cloud point is obtained from each of the at least two alternative point sets as the prediction reference point associated with the target point cloud point. In one embodiment, in this manner, it can be considered that for the point cloud points in the same point cloud group, the prediction reference points are identical. Therefore, the computer device may search for prediction reference points corresponding to the target point cloud group. If the prediction reference points corresponding to the target point cloud group are obtained, the computer device determines the prediction reference points corresponding to the target point cloud group as the prediction reference points of the target point cloud point. If the prediction reference points corresponding to the target point cloud group are not obtained, the computer device selects the d point cloud points respectively from the at least two alternative point sets, and determine the d point cloud points separately corresponding to the at least two alternative point sets as the prediction reference points associated with the target point cloud point. At the same time, the computer device may determine the d point cloud points separately corresponding to at least two alternative point sets as the prediction reference points corresponding to the target point cloud group. Through the above process, for the same point cloud group, the prediction reference points only need to be obtained once, thereby reducing the amount of data that need to be processed and improving the efficiency of obtaining prediction reference points.

In one prediction reference point obtaining manner, d point cloud points are selected respectively from the at least two alternative point sets as candidate point cloud points; first point-to-point distances between the candidate point cloud points and the target point cloud point are obtained; the candidate point cloud points are sequenced on the basis of the first point-to-point distances; and the prediction reference points associated with the target point cloud point are obtained from the sequenced candidate point cloud points. A first point-to-point distance may be a distance between a coordinate of a candidate point cloud point and a coordinate of the target point cloud point, or may be referred to as a geometrical distance, or may be a quantity of dot spacers between a candidate point cloud point and the target point cloud point in the M point cloud groups.

In the above embodiment, the candidate point cloud points are sequenced by the first point-to-point distances between the candidate point cloud points and the target point cloud point, and the prediction reference points associated with the target point cloud point are directly obtained from the sequenced candidate point cloud points, so that the efficiency of obtaining prediction reference points can be improved.

In one prediction reference point obtaining manner, second point-to-point distances between point cloud points included in the at least two alternative point sets and the target point cloud point are obtained; the point cloud points included in the at least two alternative point sets are sequenced on the basis of the second point-to-point distances; and the prediction reference points associated with the target point cloud point are obtained from the sequenced point cloud points included in the at least two alternative point sets. A second point-to-point distance may be a distance between a coordinate of a point cloud point included in the at least two alternative point sets and a coordinate of the target point cloud point, or may be referred to as a geometrical distance, or may be a quantity of dot spacers between a point cloud point included in the at least two alternative point set and the target point cloud point in the M point cloud groups. For example, for a point cloud point 1 in the alternative point set, the second point-to-point distance may be a geometrical distance between the coordinate of the point cloud point 1 and the coordinate of the target point cloud point, or may be a quantity of dot spacers between positions of the point cloud point 1 and the target point cloud point respectively in the M point cloud groups.

In the above embodiment, the point cloud points included in the at least two alternative point sets are sequenced by using the second point-to-point distances between the point cloud points included in the at least two alternative point sets and the target point cloud point, and the prediction reference points associated with the target point cloud point are directly obtained from the sequenced point cloud points included in the at least two alternative point sets, so that the efficiency of obtaining prediction reference points can be improved.

In one prediction reference point obtaining manner, set priorities separately corresponding to the at least two alternative point sets are obtained; the at least two alternative point sets are sequenced on the basis of the set priorities; and P prediction reference points associated with the target point cloud point are obtained from the at least two sequenced alternative point sets. P is a positive integer. In one embodiment, the computer device may obtain inter-group association relationships between the at least two alternative point sets and the target point cloud group, and determine, on the basis of the inter-group association relationships, the set priorities separately corresponding to the at least two alternative point sets. The inter-group association relationships include but are not limited to a neighbor association relationship, a parent association relationship, and an interval association relationship. For example, the neighbor association relationship may be considered as an inter-group association relationship between a point cloud group adjacent to the target point cloud group and the target point cloud group. The parent association relationship may be considered as an inter-group association relationship between point cloud groups with the same parent node, that is, the point cloud group sequences of two point cloud groups with the parent association relationship are identical after two shifts. The interval association relationship may be considered as an inter-group association relationship between non-adjacent point cloud groups among the M point cloud groups. In one embodiment, the set priorities separately corresponding to the at least two alternative point sets may also be preset in advance. Or, if at least two alternative point sets are obtained by multiple alternative point set obtaining methods, the set priorities separately corresponding to the at least two alternative point sets may be determined on the basis of the alternative point set obtaining methods separately corresponding to the at least two alternative point sets. That is, the obtaining manner of the set priority is not limited here.

In the above embodiment, the at least two alternative point sets are sequenced by using the set priorities separately corresponding to the at least two alternative point sets, and the prediction reference points associated with the target point cloud point are directly obtained from the at least two sequenced alternative point sets, which can improve the efficiency of obtaining prediction reference points.

In step S303, the target point cloud point is predicted on the basis of the prediction reference points, to obtain a target predicted attribute value of the target point cloud point.

In this embodiment of this disclosure, the computer device may obtain prediction reference coordinates of the prediction reference points, and obtain a target coordinate of the target point cloud point; and determine reference weights of the prediction reference points on the basis of coordinate distances between the prediction reference coordinates and the target coordinate. In an example, the computer device may obtain reciprocals of the coordinate distances, and determine the reciprocals as the reference weights of the prediction reference points corresponding to the coordinate distances. In one embodiment, the computer device may determine a sum of coordinate difference values between the prediction reference coordinates and the target coordinate in various coordinate dimensions as the coordinate distances between the prediction reference coordinates and the target coordinate. At this point, the reference weights of the prediction reference points may refer to formula (1):

$$w_{iu} = \frac{1}{|coor\_1_i - coor\_1_{iu}| + |coor\_2_i - coor\_2_{iu}| + \ldots + |coor\_dig_i - coor\_dig_{iu}|} \quad (1)$$

As shown in formula (1), $w_{iu}$ is used for representing a reference weight between a $u^{th}$ prediction reference point of an $i^{th}$ point cloud point and the $i^{th}$ point cloud point, and the subscript iu is used for representing the $u^{th}$ prediction reference point of the $i^{th}$ point cloud point. For example, coor_2iu is used for representing a coordinate value of the $u^{th}$ prediction reference point of the $i^{th}$ point cloud point in the second coordinate dimension. An absolute value of a difference value between the coordinate value of the $u^{th}$ prediction reference point in the second coordinate dimension and the coordinate value of the $i^{th}$ point cloud point in the second coordinate dimension may be the coordinate difference value between the $u^{th}$ prediction reference point and the $i^{th}$ point cloud point in the second coordinate dimension, namely, |coor_2i−coor_2iu|. Similarly, the coordinate difference values between the $i^{th}$ point cloud point and the $u^{th}$ prediction reference point of the $i^{th}$ point cloud point in the various coordinate dimensions can be obtained, where i is a positive integer less than or equal to k. Assuming that dig is 3, namely, that the coordinate dimension number is 3, including three coordinate dimensions x, y, and z, the reference weight of the prediction reference point may be shown in formula (2):

$$w_{iu} = \frac{1}{|x_i - x_{iu}| + |y_i - y_{iu}| + |z_i - z_{iu}|} \quad (2)$$

In one embodiment, the computer device may obtain dimension weights separately corresponding to the dig coordinate dimensions, and perform weighted summation on the coordinate difference values between the prediction reference coordinates and the target coordinate in the various coordinate dimensions on the basis of the dimension weights separately corresponding to the dig coordinate dimensions, to obtain the coordinate distances between the prediction reference coordinates and the target coordinate. At this time, assuming that dig is 3, namely, that the coordinate dimension number is 3, including three coordinate dimensions x, y, and z, the reference weight of the prediction reference point may be shown in formula (3):

$$w_{iu} = \frac{1}{a|x_i - x_{iu}| + b|y_i - y_{iu}| + c|z_i - z_{iu}|} \quad (3)$$

As shown in formula (3), a is used for representing a dimension weight corresponding to the x coordinate dimension; b is used for representing a coordinate dimension corresponding to the y coordinate dimension; and c is used for representing a dimension weight corresponding to the z coordinate dimension.

In one embodiment, the coordinate distances between the prediction reference points and the target point cloud point are not limited to being obtained by the above calculation method. For example, three coordinate dimensions (the x coordinate dimension, the y coordinate dimension, and the z coordinate dimension) are taken as an example, and the coordinate distances between the $i^{th}$ point cloud point and the $u^{th}$ prediction reference point of the i th point cloud point may also be obtained through a formula $\sqrt{|x_i-x_{iu}|^2+|y_i-y_{iu}|^2+|z_i-z_{iu}|^2}$, which will not be limited here.

Further, reference attribute reconstruction values of the prediction reference points may be obtained, and weighting processing is performed on the basis of the reference attribute reconstruction values and the reference weights, to obtain the target predicted attribute value of the target point cloud point. The target predicted attribute value may be obtained referring to formula (4):

$$A = \frac{\sum_{u=1}^{num} w_{iu} \widehat{A_{iu}}}{\sum_{u=1}^{num} w_{iu}} \quad (4)$$

As shown in formula (4), $\widehat{A_{iu}}$ is used for representing the reference attribute reconstruction value of the u th prediction reference point of the $i^{th}$ point cloud point; $w_{iu}$ is used for representing the reference weight between $u^{th}$ prediction reference point of the $i^{th}$ point cloud point and the $i^{th}$ point cloud point, and num is used for representing a total quantity of the prediction reference points of the $i^{th}$ point cloud point.

A predicted attribute value of any point cloud point among the k point cloud points may be obtained through the above formulas (1) to (4). The target point cloud point is any of the k point cloud points. Therefore, the target predicted attribute value of the target point cloud point may be obtained through the above formulas (1) to (4).

In one embodiment, during the performing weighting process on the basis of the reference attribute reconstruction values and the reference weights, to obtain the target predicted attribute value of the target point cloud point, optimization parameters may also be used to optimize the reference weights to obtain optimized weight, and the weighting process may be performed on the basis of the reference attribute reconstruction values and the optimized weights, to obtain the target predicted attribute value of the target point cloud point. The optimization parameters may include but are not limited to an attribute quantization step size, a reference quantity of prediction reference points with the maximum coordinate distances from the target point cloud point, or the like. For example, the computer device may determine the attribute quantization step size as an optimization parameter. Or, the computer device may obtain, from the prediction reference points, the reference quantity of prediction reference points with the maximum coordinate distances from the target point cloud point, and determine the reference quantity as the optimization parameter. Or, a smaller value of the above obtained attribute quantization step size and the reference quantity may be obtained as the optimization parameter, that is, if the attribute quantization step size is greater than the reference quantity, the reference quantity is determined as the optimization parameter. If the attribute quantization step size is less than the reference quantity, the attribute quantization step size is determined as the optimization parameter. If the attribute quantization step size is equal to the reference quantity, either the attribute quantization step size or the reference quantity is determined as optimization parameter.

In the above embodiment, the reference weights of the prediction reference points are determined by using the coordinate distances between the prediction reference coordinates of the prediction reference points and the target coordinate of the target point cloud point, and the weighting processing is performed on the basis of the reference attribute reconstruction values of the prediction reference points and the reference weights, to obtain the target predicted attribute value of the target point cloud point, which can improve the prediction accuracy of the target predicted attribute value.

Further, the computer device may obtain a target actual attribute value of the target point cloud point, and obtain a target attribute residual of the target point cloud point on the basis of a difference value between the target actual attribute value and the target predicted attribute value of the target point cloud point; and perform quantization transform on the target attribute residual, to obtain a target transformation coefficient of the target point cloud point. This quantization transform manner is not limited here. For example, discrete cosine transform (DCT) may be performed on the target attribute residual, to obtain the target transformation coefficient of the target point cloud point, or the target transformation coefficient of the target point cloud point may be obtained by constructing a binary tree. The target transformation coefficient includes a first transformation coefficient and a second transformation coefficient. In one embodiment, the computer device may also obtain attribute residuals of the point cloud points included in the target point cloud group, perform quantization transform on the attribute residuals of the point cloud points included in the target point cloud group, and obtain transformation coefficients of the point cloud points included in the target point cloud group, including the target transformation coefficient of the target point cloud point.

In the above embodiment, the target attribute residual of the target point cloud point is obtained by using the difference value between the target actual attribute value of the target point cloud point and the target predicted attribute value of the target point cloud point, and the quantization transform is performed on the target attribute residual, to obtain the target transformation coefficient of the target point cloud point, to better code the target point cloud point, which further improves the coding performance and the coding efficiency.

Further, the computer device may code the target point cloud point group by group. In an example, the computer device obtains transformation coefficients of point cloud points included in the target point cloud group, and codes the transformation coefficients of the point cloud points included in the target point cloud group, to obtain a target code stream corresponding to the target point cloud group.

In the above embodiment, the transformation coefficients of the point cloud points included in the target point cloud group are directly coded, to obtain the target code stream corresponding to the target point cloud group, which improves the efficiency of obtaining coding results, thus improving the coding performance and the coding efficiency.

Or, the computer device may obtain a group quantity limit threshold, obtain, on the basis of the group quantity limit threshold, g to-be-coded point cloud groups containing the target point cloud group, obtain transformation coefficients of point cloud points included in the g to-be-coded point cloud groups, and code the transformation coefficients of the point cloud points included in the g to-be-coded point cloud groups, to obtain group code streams corresponding to the g to-be-coded point cloud groups, g being a positive integer less than or equal to the group quantity limit threshold. The quantity of point cloud groups that need to be coded at one time is limited, so that part of coding results can be obtained without waiting for all the point cloud points to be coded, thereby reducing a coding failure caused by an abnormal situation (such as abnormal interruption) during the coding, improving the efficiency of obtaining coding results, and improving the coding performance and the coding efficiency.

In this embodiment of this disclosure, an alternative point set of a target point cloud group where a target point cloud point is located is obtained, the alternative point set belonging to M point cloud groups, and the M point cloud groups including the target point cloud group, coordinate code words of point cloud points included in each point cloud group being identical after shifting by a grouping shift bit number corresponding to the point cloud group where the point cloud points are located, and M being a positive integer; and prediction reference points associated with the target point cloud point are obtained from the alternative point set, and the target point cloud point is predicted on the basis of the prediction reference points, to obtain a target predicted attribute value of the target point cloud point. On this basis, coding or decoding can be performed on the basis of the target predicted attribute value, that is, coding and decoding are performed on a point cloud. The alternative point set is obtained from a point cloud group. The point cloud group is obtained by grouping point cloud points on the basis of coordinate code words of the point cloud points. The prediction reference points associated with the target point cloud point are obtained from the obtained alternative point set, so that the spatial correlation between the various point cloud groups can be considered. Therefore, corresponding attribute prediction can be performed on the basis of the spatial correlation between the various point cloud groups, thus improving the accuracy of point cloud prediction. Furthermore, coding and decoding based on this can improve the coding and decoding performance and the coding and decoding efficiency.

Figure 5:
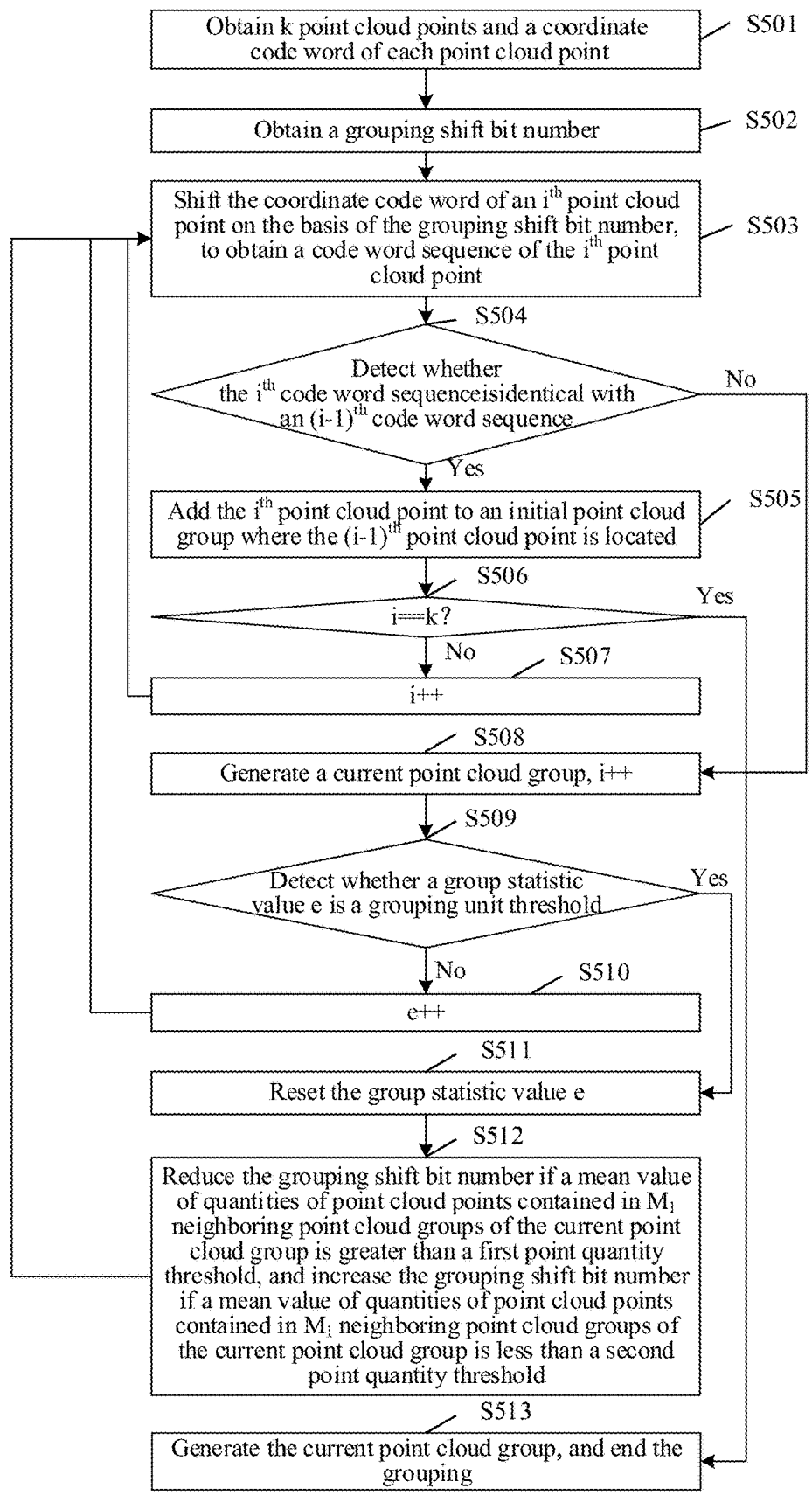
FIG. 5 is an point cloud point grouping process according to an embodiment of this disclosure.

In one embodiment, if the grouping shift bit number is a variable, referring to FIG. 5, FIG. 5 is a point cloud point grouping process according to one embodiment of this disclosure. As shown in the FIG. 5, the point cloud point grouping process includes the following steps:

In step S501, k point cloud points and a coordinate code word of each point cloud point are obtained.

In this embodiment of this disclosure, the computer device may obtain the k point cloud points and the coordinate code word of each point cloud point. For example, the computer device may obtain space filling curve code words of a space filling curve, and obtain the coordinate code words separately corresponding to the k point cloud points from the space filling curve code words.

In step S502, a grouping shift bit number is obtained.

In this embodiment of this disclosure, a grouping shift bit number L can be obtained. In this embodiment, L is a variable.

In step S503, the coordinate code word of an i th point cloud point is shifted on the basis of the grouping shift bit number, to obtain a code word sequence of the i th point cloud point.

In this embodiment of this disclosure, the computer device may shift the coordinate code word of the i th point cloud point, to obtain the code word sequence of the $i^{th}$ point cloud point. For example, assuming that the coordinate code word of the i th point cloud point is "0010101110", and that the grouping shift bit number is 3, the coordinate code word of the $i^{th}$ point cloud point is shifted to obtain the code word sequence of the $i^{th}$ point cloud point, which is "0010101".

In step S504, whether the i th code word sequence is identical with an $(i-1)^{th}$ code word sequence is detected.

In this embodiment of this disclosure, the computer device may detect whether the $i^{th}$ code word sequence is identical with the $(i-1)^{th}$ code word sequence. If i is 1, the code word sequence of an $(i-1)^{th}$ point cloud point is empty or a special identifier by default. If the code word sequence of the i th point cloud point is identical with the code word sequence of the $(i-1)^{th}$ point cloud point, step S505 is executed. If the code word sequence of the i th point cloud point is different from the code word sequence of the $(i-1)^{th}$ point cloud point, step S508 is executed.

In step S505, the $i^{th}$ point cloud point is added to an initial point cloud group where the $(i-1)^{th}$ point cloud point is located.

In this embodiment of this disclosure, if the code word sequence of the $i^{th}$ point cloud point is identical with the code word sequence of the $(i-1)^{th}$ point cloud point, it means that the $i^{th}$ point cloud point and the $(i-1)^{th}$ point cloud point are divided to one point cloud group, and the $i^{th}$ point cloud point can be added to the initial point cloud group where the $(i-1)^{th}$ point cloud point is located. In an example, if the $(i-1)^{th}$ point cloud point does not have an initial point cloud group, an initial point cloud group can be created on the basis of the i th point cloud point and the $(i-1)^{th}$ point cloud point. If the $(i-1)^{th}$ point cloud point has an initial point cloud group, the $i^{th}$ point cloud point is added to the initial point cloud group where the $(i-1)^{th}$ point cloud point is located. For example, i is 4. If the code word sequence of the fourth point cloud point is identical with the code word sequence of the third point cloud point, the fourth point cloud point is added to the initial point cloud group where the third point cloud point is located. If the third point cloud point does not have an initial point cloud group, an initial point cloud group can be created on the basis of the third point cloud point and the fourth point cloud point. If the third point cloud point has an initial point cloud group, the fourth point cloud point can be added to the initial point cloud group where the third point cloud point is located.

In step S506, i==k? is determined.

In this embodiment of this disclosure, whether i is k is detected, that is, whether the k point cloud points have been grouped. If i is k, step S513 is executed. If i is not k, step S507 is executed.

In step S507. i is incremented by i++.

In this embodiment of this disclosure, a value of i plus one means processing a next point cloud point.

In step S508, a current point cloud group is generated, and i is incremented by i++.

In this embodiment of this disclosure, the initial point cloud group where the $(i-1)^{th}$ point cloud point is located can be obtained, and the initial point cloud group where the $(i-1)^{th}$ point cloud point is located can be determined as one point cloud group. In one embodiment, if the $(i-1)^{th}$ point cloud point does not have an initial point cloud group, the $(i-1)^{th}$ point cloud point forms one point cloud group. Further, whether i is k can be detected; and if i is k, step S513 is executed. If i is not k, i is updated, namely, i++, and step S509 is executed.

In step S509, whether a group statistic value e is a grouping unit threshold is detected.

In this embodiment of this present disclosure, whether the group statistic value e is the grouping unit threshold is detected. If e is the grouping unit threshold, step S511 is executed. If e is not the grouping unit threshold, step S510 is executed. An initial value of e is 0.

In step S510, e is incremented by e++.

In this embodiment of this disclosure, a value of e is added with one, and step S503 is executed.

In step S511, the group statistic value e is reset.

In this embodiment of this disclosure, the group statistic value e is reset, that is, the group statistic value e is reset to an initial value, and step S512 is executed.

In step S512, the grouping shift bit number is reduced if a mean value of quantities of point cloud points contained in $M_1$ neighboring point cloud groups of the current point cloud group is greater than a first point quantity threshold, and the grouping shift bit number is increased if a mean value of quantities of point cloud points contained in $M_1$ neighboring point cloud groups of the current point cloud group is less than a second point quantity threshold.

In this embodiment of this disclosure, the grouping shift bit number is updated, namely, the value of L is updated, and step S503 is executed.

In step S513, the current point cloud group is generated, and the grouping is ended.

In this embodiment of this disclosure, the current point cloud group is generated on the basis of the initial point cloud group where the $i^{th}$ point cloud point is located. In one embodiment, if the $i^{th}$ point cloud point does not have an initial point cloud group, the current point cloud group is generated on the basis of the $i^{th}$ point cloud point. At this time, M point cloud groups composed of the k point cloud points are obtained, and the grouping ends.

Figure 6:
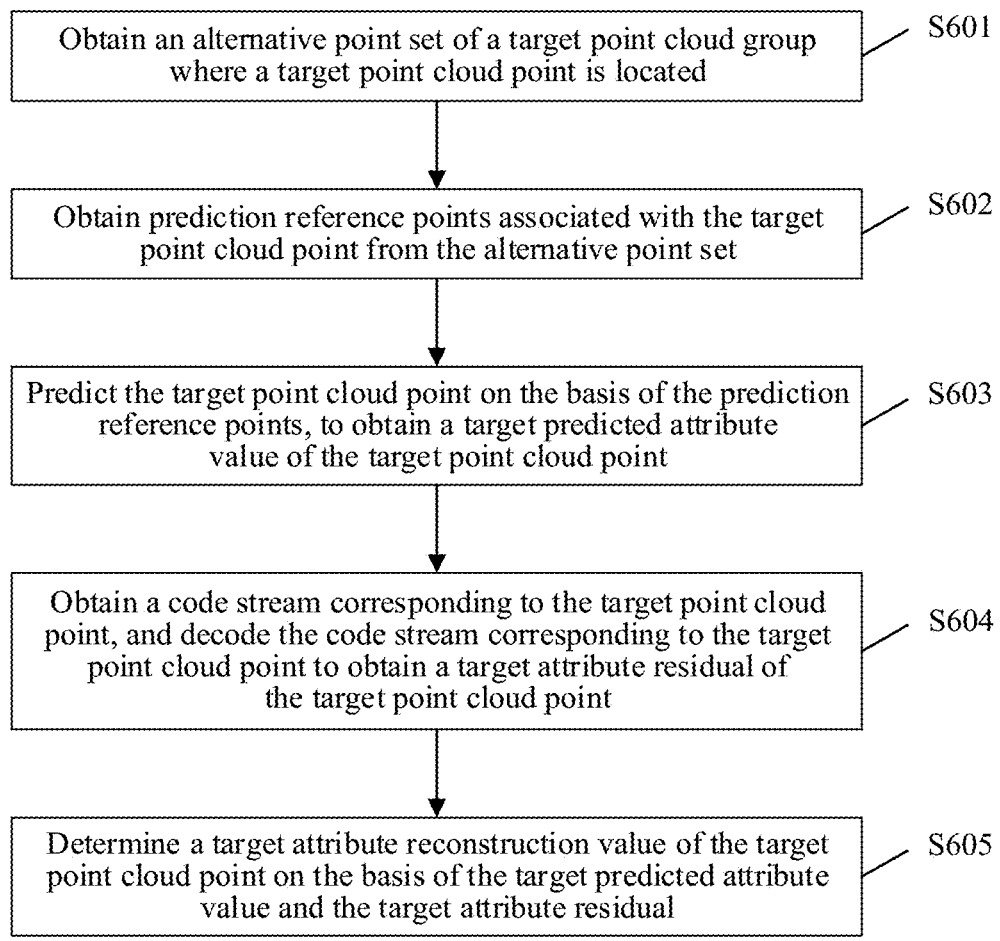
FIG. 6 is a flow chart of a point cloud prediction processing method in a decoding process according to an embodiment of this disclosure.

Further, referring to FIG. 6, FIG. 6 is a flow chart of a point cloud prediction processing method in a decoding process according to an embodiment of this disclosure. As shown in FIG. 6, the point cloud prediction processing process includes the following steps:

In step S601, an alternative point set of a target point cloud group, where a target point cloud point is located, is obtained.

In this embodiment of this disclosure, the alternative point set belongs to M point cloud groups, and the M point cloud groups include the target point cloud group. Coordinate code words of point cloud points included in each point cloud group are identical after shifting by a grouping shift bit number corresponding to the point cloud group where the point cloud points are located. M is a positive integer. For an exemplary implementation process, reference may be made to the description of step S301 in FIG. 3.

In step S602, prediction reference points associated with the target point cloud point are obtained from the alternative point set.

In this embodiment of this disclosure, for an exemplary implementation process, reference may be made to the description of step S302 in FIG. 3.

In step S603, the target point cloud point is predicted on the basis of the prediction reference points, to obtain a target predicted attribute value of the target point cloud point.

In this embodiment of this disclosure, for an exemplary implementation process, reference may be made to the description of step S303 in FIG. 3.

A predicted attribute value of any point cloud point among the k point cloud points may be obtained through the above process, where k is a positive integer, and the target point cloud point refers to any point cloud point among the k point cloud points.

In step S604, a code stream corresponding to the target point cloud point is obtained, and the code stream corresponding to the target point cloud point is decoded to obtain a target attribute residual of the target point cloud point.

In this embodiment of this disclosure, the code stream corresponding to the target point cloud point is decoded to obtain a target transformation coefficient of the target point cloud point; and inverse transformation is performed on the target transformation coefficient to obtain the target attribute residual of the target point cloud point.

In the above embodiment, the inverse transformation is directly performed on the target transformation coefficient of the target point cloud point to obtain the target attribute residual of the target point cloud point, which can improve the efficiency of obtaining a target attribute residual.

In one embodiment, if coding is performed on the basis of a group quantity limit threshold, the code stream corresponding to the target point cloud point refers to a code stream of a plurality of point cloud groups including the target point cloud group where the target point cloud point is located. Or, if the code stream is coded group by group, the code stream corresponding to the target point cloud point refers to a code stream of the target point cloud group, or the like. In an example, the computer device may decode the code stream corresponding to the target point cloud point, obtain a transformation coefficient sequence corresponding to the code stream, perform reverse sequencing on the transformation coefficient sequence corresponding to the code stream, and obtain the transformation coefficients of the various point cloud points in the point cloud group corresponding to the code stream, including the target transformation coefficient of the target point cloud point. Among them, the reverse sequencing is a sequencing manner that restores the sequencing manner of the transformation coefficients during the coding.

In step S605, a target attribute reconstruction value of the target point cloud point is determined on the basis of the target predicted attribute value and the target attribute residual.

In this embodiment of this disclosure, attribute fusion can be performed on the target predicted attribute value and the target attribute residual, to obtain the target attribute reconstruction value of the target point cloud point. The attribute fusion may be attribute summation.

The execution orders of the above step S601 to step S603, and step S604 are not limited, that is, step S604 may also be executed first, and step S601 to step S603 are then executed.

In this embodiment of this disclosure, an alternative point set of a target point cloud group where a target point cloud point is located is obtained, the alternative point set belonging to M point cloud groups, and the M point cloud groups including the target point cloud group, coordinate code words of point cloud points included in each point cloud group being identical after shifting by a grouping shift bit number corresponding to the point cloud group where the point cloud points are located, and M being a positive integer; and prediction reference points associated with the target point cloud point are obtained from the alternative point set, and the target point cloud point is predicted on the basis of the prediction reference points, to obtain a target predicted attribute value of the target point cloud point. On this basis, coding or decoding can be performed on the basis of the target predicted attribute value, that is, coding and decoding are performed on a point cloud. The alternative point set is obtained from a point cloud group. The point cloud group is obtained by grouping point cloud points on the basis of coordinate code words of the point cloud points. The prediction reference points associated with the target point cloud point are obtained from the obtained alternative point set, so that the spatial correlation between the various point cloud groups can be considered. Therefore, corresponding attribute prediction can be performed on the basis of the spatial correlation between the various point cloud groups, thus improving the accuracy of point cloud prediction. Furthermore, coding and decoding based on this can improve the coding and decoding performance and the coding and decoding efficiency.

Figure 7:
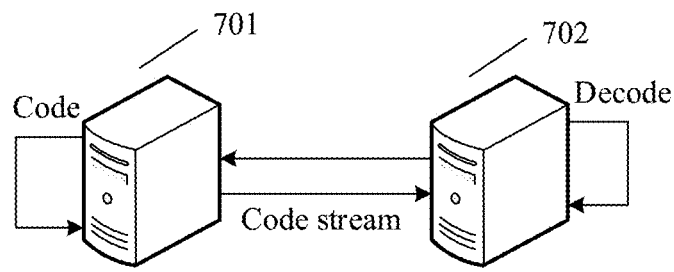
FIG. 7 is a data interaction architecture diagram according to an embodiment of this disclosure.

The above coding process and decoding process can be implemented in the same computer device, or can be implemented in different computer devices. For example, when the coding process and the decoding process are implemented in different computer devices, referring to FIG. 7, FIG. 7 is a data interaction architecture diagram according to an embodiment of this disclosure. As shown in FIG. 7, a computer device 701 may code k point cloud points to obtain a coded code stream. There may be one or at least two code streams corresponding to the k point cloud points. The computer device 701 may send the coded code stream to a computer device 702. The computer device 702 may decode the obtained code stream to obtain the k point cloud points. In an example, attribute reconstruction values separately corresponding to the k point cloud points can be obtained. In one embodiment, the computer device 701 may obtain the k point cloud points from the computer device 701, or may obtain the k point cloud points from the computer device 702, or may obtain the k point cloud points from other associated devices, which will not be limited here.

Figure 8:
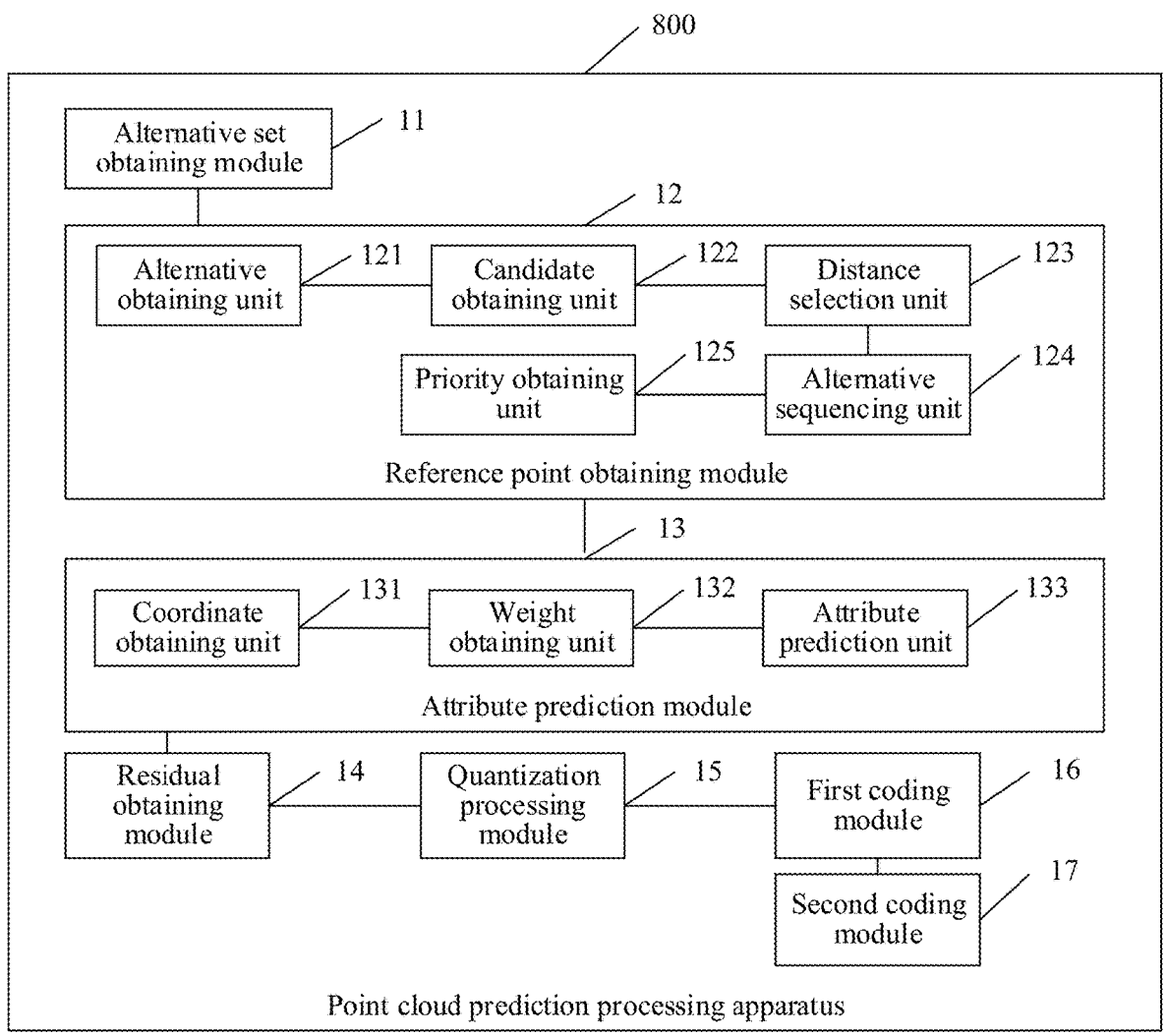
FIG. 8 is a schematic diagram of a point cloud prediction processing apparatus according to an embodiment of this disclosure.

Further, referring to FIG. 8, FIG. 8 is a schematic diagram of a point cloud prediction processing apparatus according to an embodiment of this disclosure. The point cloud prediction processing apparatus may be a computer-readable instruction (including a program code and the like) run in a computer device. For example, the point cloud prediction processing apparatus may be application software. The apparatus may be configured to perform the corresponding steps in the method provided by the embodiments of this disclosure. As shown in FIG. 8, the point cloud prediction processing apparatus 800 may be applied to the computer device in the corresponding embodiment of FIG. 3. The apparatus may include an alternative set obtaining module 11, a reference point obtaining module 12, and an attribute prediction module 13.

The alternative set obtaining module 11 is configured to obtain an alternative point set of a target point cloud group where a target point cloud point is located, the alternative point set belonging to M point cloud groups, and the M point cloud groups including the target point cloud group, coordinate code words of point cloud points included in each point cloud group being identical after shifting by a grouping shift bit number corresponding to the point cloud group where the point cloud points are located, and M being a positive integer.

The reference point obtaining module 12 is configured to obtain a prediction reference point associated with the target point cloud point from the alternative point set.

The attribute prediction module 13 is configured to predict the target point cloud point on the basis of the prediction reference points, to obtain a target predicted attribute value of the target point cloud point.

All the grouping shift bit numbers separately corresponding to the M point cloud groups are default grouping shift bit numbers. Or, in a case that a mean value of quantities of point cloud points respectively contained in $M_1$ neighboring point cloud groups adjacent to the target point cloud group is greater than a first point quantity threshold, the grouping shift bit number corresponding to the target point cloud group is less than the grouping shift bit numbers separately corresponding to the $M_1$ neighboring point cloud groups; in a case that a mean value of quantities of point cloud points respectively contained in $M_1$ neighboring point cloud groups adjacent to the target point cloud group is less than a second point quantity threshold, the grouping shift bit number corresponding to the target point cloud group is greater than the grouping shift bit numbers separately corresponding to the $M_1$ neighboring point cloud groups. $M_1$ is a positive integer less than M.

The alternative point set includes point cloud groups, located in front of the target point cloud group and adjacent to the target point cloud group, among the M point cloud groups. A total quantity of point cloud points included in the alternative point set is less than or equal to a third point quantity threshold.

The alternative point set includes point cloud groups, located in front of the target point cloud group, among the M point cloud groups. A quantity of point cloud points included in each alternative point set is greater than or equal to an in-group point quantity threshold.

The alternative point set includes N point cloud groups, located in front of the target point cloud group, among the M point cloud groups. N is a positive integer, and N is a default neighboring group threshold.

One point cloud group corresponds to one point cloud group sequence; and the point cloud group sequence is obtained after shifting, according to the grouping shift bit number of the corresponding point cloud group, the coordinate code words of the point cloud points included in the corresponding point cloud group.

In a case that a target grouping shift bit number corresponding to the target point cloud group is a multiple of a coordinate dimension number, an alternative shift sequence obtained after an alternative point cloud group sequence corresponding to the alternative point set is shifted by a first multiple of the coordinate dimension number is identical with a target shift sequence obtained after a target point cloud group sequence corresponding to the target point cloud group is shifted by the first multiple of the coordinate dimension number. The coordinate dimension number refers to a quantity of dimensions corresponding to the coordinate code words of the point cloud points included in each point cloud group.

In a case that a target grouping shift bit number corresponding to the target point cloud group is not a multiple of the coordinate dimension number, an alternative shift sequence obtained after an alternative point cloud group sequence corresponding to the alternative point set is shifted by a supplementary dimension number is identical with a target shift sequence obtained after a target point cloud group sequence corresponding to the target point cloud group is shifted by the supplementary dimension number. The supplementary dimension number refers to a bit number difference value between a reminder and the coordinate dimension, and the reminder refers to a reminder between the target grouping shift bit number and the coordinate dimension. Or, the supplementary dimension number refers to a sum of the bit number difference value and a second multiple of the coordinate dimension number.

There are at least two alternative point sets. The reference point obtaining module 12 includes an alternative obtaining unit 121, configured to select d point cloud points respectively from the at least two alternative point sets, and determine the d point cloud points separately corresponding to the at least two alternative point sets as prediction reference points associated with the target point cloud point; and d is a positive integer.

There are at least two alternative point sets. The reference point obtaining module 12 includes a candidate obtaining unit 122 and a distance selection unit 123.

The candidate obtaining unit 122 is configured to select d point cloud points respectively from the at least two alternative point sets as candidate point cloud points; and The distance selection unit 123 is configured to obtain first point-to-point distances between the candidate point cloud points and the target point cloud point, sequence the candidate point cloud points on the basis of the first point-to-point distances, and obtain the prediction reference points associated with the target point cloud point from the sequenced candidate point cloud points.

There are at least two alternative point sets. The reference point obtaining module 12 includes an alternative sequencing unit 124, configured to obtain second point-to-point distances between point cloud points included in the at least two alternative point sets and the target point cloud point, sequence the point cloud points included in the at least two alternative point sets on the basis of the second point-to-point distances, and obtain the prediction reference points associated with the target point cloud point from the sequenced point cloud points included in the at least two alternative point sets.

There are at least two alternative point sets. The reference point obtaining module 12 includes a priority obtaining unit 125, configured to obtain set priorities separately corresponding to the at least two alternative point sets, sequence the at least two alternative point sets on the basis of the set priorities, and obtain P prediction reference points associated with the target point cloud point from the at least two sequenced alternative point sets. P is a positive integer.

The attribute prediction module 13 includes a coordinate obtaining unit 131, a weight obtaining unit 132, and an attribute prediction unit 133.

The coordinate obtaining unit 131 is configured to obtain prediction reference coordinates of the prediction reference points, and obtain a target coordinate of the target point cloud point.

The weight obtaining unit 132 is configured to determine reference weights of the prediction reference points on the basis of coordinate distances between the prediction reference coordinates and the target coordinate.

The attribute prediction unit 133 is configured to obtain reference attribute reconstruction values of the prediction reference points, and perform weighting processing on the basis of the reference attribute reconstruction values and the reference weights, to obtain the target predicted attribute value of the target point cloud point.

The apparatus 800 further includes a residual obtaining module 14 and a quantization processing module 15.

The residual obtaining module 14 is configured to obtain a target actual attribute value of the target point cloud point, and obtain a target attribute residual of the target point cloud point on the basis of a difference value between the target actual attribute value and the target predicted attribute value of the target point cloud point.

The quantization processing module 15 is configured to perform quantization transform on the target attribute residual, to obtain a target transformation coefficient of the target point cloud point.

The apparatus 800 further includes a first coding module 16 and a second coding module 17.

The first coding module 16 is configured to obtain transformation coefficients of point cloud points included in the target point cloud group, and code the transformation coefficients of the point cloud points included in the target point cloud group, to obtain a target code stream corresponding to the target point cloud group.

The second coding module 17 is configured to obtain a group quantity limit threshold, obtain, on the basis of the group quantity limit threshold, g to-be-coded point cloud groups containing the target point cloud group, obtain transformation coefficients of point cloud points included in the g to-be-coded point cloud groups, and code the transformation coefficients of the point cloud points included in the g to-be-coded point cloud groups, to obtain group code streams corresponding to the g to-be-coded point cloud groups, g being a positive integer less than or equal to the group quantity limit threshold.

Figure 9:
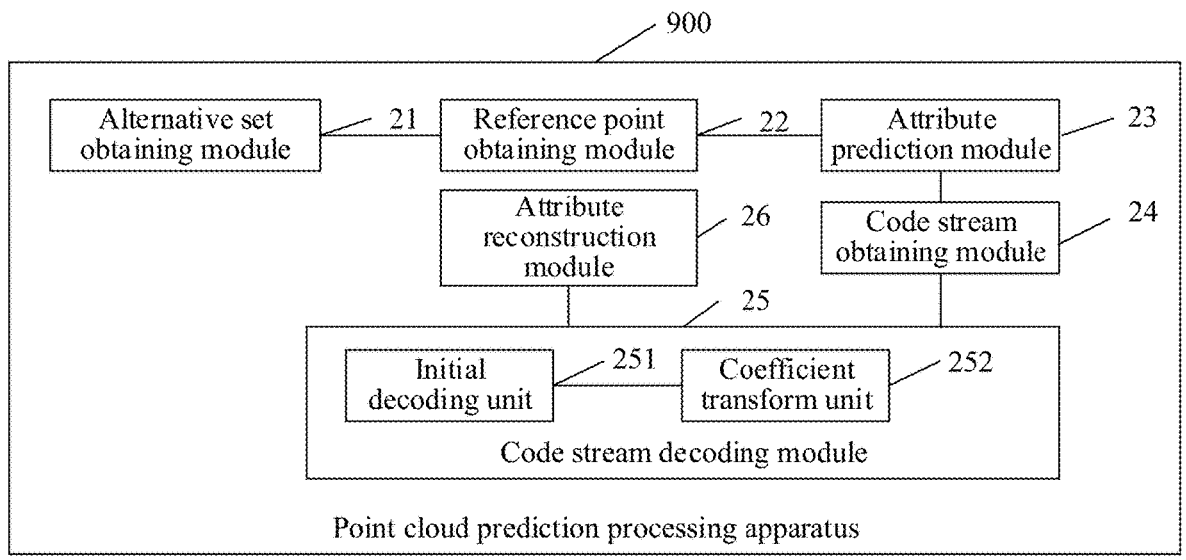
FIG. 9 is a schematic diagram of a point cloud prediction processing apparatus according to an embodiment of this disclosure.

Further, referring to FIG. 9, FIG. 9 is a schematic diagram of a point cloud prediction processing apparatus according to an embodiment of this disclosure. The point cloud prediction processing apparatus may be a computer-readable instruction (including a program code and the like) run in a computer device. For example, the point cloud prediction processing apparatus may be application software. The apparatus may be configured to perform the corresponding steps in the method provided by the embodiments of this disclosure. As shown in FIG. 9, the point cloud prediction processing apparatus 900 may be applied to the computer device in the corresponding embodiment of FIG. 6. The apparatus may include an alternative set obtaining module 21, a reference point obtaining module 22, an attribute prediction module 23, a code stream obtaining module 24, a code stream decoding module 25, and an attribute reconstruction module 26.

The alternative set obtaining module 21 is configured to obtain an alternative point set of a target point cloud group where a target point cloud point is located, the alternative point set belonging to M point cloud groups, and the M point cloud groups including the target point cloud group, coordinate code words of point cloud points included in each point cloud group being identical after shifting by a grouping shift bit number corresponding to the point cloud group where the point cloud points are located, and M being a positive integer.

The reference point obtaining module 22 is configured to obtain a prediction reference point associated with the target point cloud point from the alternative point set.

The attribute prediction module 23 is configured to predict the target point cloud point on the basis of the prediction reference points, to obtain a target predicted attribute value of the target point cloud point.

The code stream obtaining module 24 is configured to obtain a code stream corresponding to the target point cloud point.

The code stream decoding module 25 is configured to decode the code stream corresponding to the target point cloud point to obtain a target attribute residual of the target point cloud point.

The attribute reconstruction module 26 is configured to determine a target attribute reconstruction value of the target point cloud point on the basis of the target predicted attribute value and the target attribute residual.

The code stream decoding module 25 includes an initial decoding unit 251 and a coefficient transform unit 252.

The initial decoding unit 251 is configured to decode the code stream corresponding to the target point cloud point to obtain a target transformation coefficient of the target point cloud point.

The coefficient transform unit 252 is configured to perform inverse transformation on the target transformation coefficient to obtain the target attribute residual of the target point cloud point.

The embodiments of this disclosure provide a point cloud prediction processing apparatus. The apparatus may obtain an alternative point set of a target point cloud group where a target point cloud point is located, the alternative point set belonging to M point cloud groups, and the M point cloud groups including the target point cloud group, coordinate code words of point cloud points included in each point cloud group being identical after shifting by a grouping shift bit number corresponding to the point cloud group where the point cloud points are located, and M being a positive integer; and obtain prediction reference points associated with the target point cloud point from the alternative point set, and predict the target point cloud point is predicted on the basis of the prediction reference points, to obtain a target predicted attribute value of the target point cloud point. On this basis, coding or decoding can be performed on the basis of the target predicted attribute value, that is, coding and decoding are performed on a point cloud. The alternative point set is obtained from a point cloud group. The point cloud group is obtained by grouping point cloud points on the basis of coordinate code words of the point cloud points. The prediction reference points associated with the target point cloud point are obtained from the obtained alternative point set, so that the spatial correlation between the various point cloud groups can be considered. Therefore, corresponding attribute prediction can be performed on the basis of the spatial correlation between the various point cloud groups, thus improving the accuracy of point cloud prediction. Furthermore, coding and decoding based on this can improve the coding and decoding performance and the coding and decoding efficiency.

Figure 10:
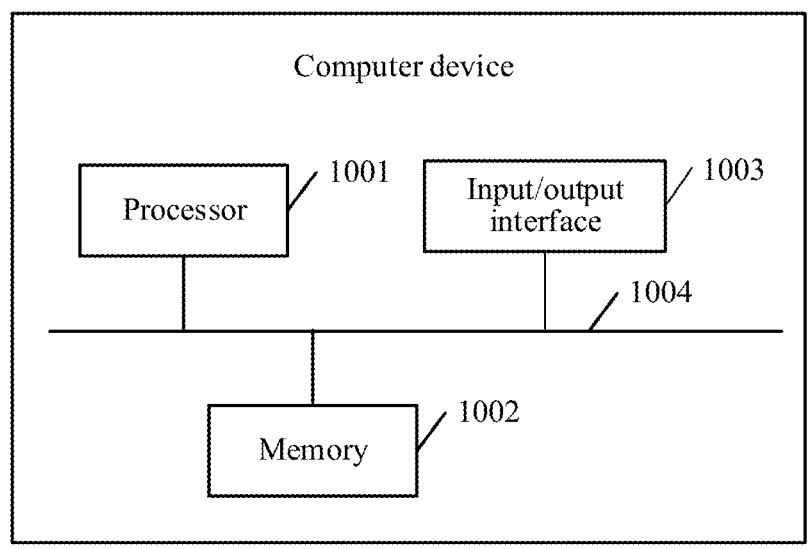
FIG. 10 is a schematic structural diagram of a computer device according to an embodiment of this disclosure.

Referring to FIG. 10, FIG. 10 is a schematic structural diagram of a computer device according to an embodiment of this disclosure. As shown in FIG. 10, the computer device in this embodiment of this disclosure may include processing circuitry (such as one or more processors 1001), a memory 1002, and an input/output interface 1003. The processors 1001, the memory 1002, and the input/output interface 1003 are connected by a bus 1004. The memory 1002 is configured to store computer-readable instructions. The computer-readable instructions include program instructions, and the input/output interface 1003 is used for receiving and outputting data, for example, data interaction. The processors 1001 are configured to execute the program instructions stored in the memory 1002.

During coding, the processors 1001 may perform the following operations:

obtaining an alternative point set of a target point cloud group where a target point cloud point is located, the alternative point set belonging to M point cloud groups, and the M point cloud groups including the target point cloud group, coordinate code words of point cloud points included in each point cloud group being identical after shifting by a grouping shift bit number corresponding to the point cloud group where the point cloud points are located, and M being a positive integer; and obtaining prediction reference points associated with the target point cloud point from the alternative point set, and predicting the target point cloud point on the basis of the prediction reference points, to obtain a target predicted attribute value of the target point cloud point.

During decoding, the processors 1001 may perform the following operations:

obtaining an alternative point set of a target point cloud group where a target point cloud point is located, the alternative point set belonging to M point cloud groups, and the M point cloud groups including the target point cloud group, coordinate code words of point cloud points included in each point cloud group being identical after shifting by a grouping shift bit number corresponding to the point cloud group where the point cloud points are located, and M being a positive integer;

obtaining prediction reference points associated with the target point cloud point from the alternative point set, and predicting the target point cloud point on the basis of the prediction reference points, to obtain a target predicted attribute value of the target point cloud point; and obtaining a code stream corresponding to the target point cloud point, decoding the code stream corresponding to the target point cloud point to obtain a target attribute residual of the target point cloud point, and determining a target attribute reconstruction value of the target point cloud point on the basis of the target predicted attribute value and the target attribute residual.

In some implementations, the processor 1001 may be a central processing unit (CPU). The processor may also be other general-purpose processors, digital signal processors (DSPs), application specific integrated circuits (ASICs), field-programmable gate arrays (FPGAs), or other programmable logic devices, discrete gate or transistor logic devices, and discrete hardware components. The general-purpose processor may be a microprocessor, or the processor may be any conventional processor, or the like.

The memory 1002 may include a read-only memory and a random access memory, and provide an instruction and data to the processor 1001 and the input/output interface 1003. A part of the memory 1002 may further include a non-volatile random access memory. For example, the memory 1002 may also store information about device types.

In an implementation, the computer device may implement the implementation manner in the various steps in FIG. 3 or FIG. 6 through built-in functional modules thereof. For details, please refer to the implementation manner in the various steps in FIG. 3 or FIG. 6, which will not be repeated here.

The embodiments of this disclosure further provide a computer device, including a processor, an input/output interface, and a memory. The processor obtains computer-readable instructions in the memory to execute the various steps of the method shown in FIG. 3, to perform a point cloud prediction processing operation. This embodiment of this disclosure obtains an alternative point set of a target point cloud group where a target point cloud point is located is obtained, the alternative point set belonging to M point cloud groups, and the M point cloud groups including the target point cloud group, coordinate code words of point cloud points included in each point cloud group being identical after shifting by a grouping shift bit number corresponding to the point cloud group where the point cloud points are located, and M being a positive integer; and obtains prediction reference points associated with the target point cloud point from the alternative point set, and predicts the target point cloud point is predicted on the basis of the prediction reference points, to obtain a target predicted attribute value of the target point cloud point. On this basis, coding or decoding can be performed on the basis of the target predicted attribute value, that is, coding and decoding are performed on a point cloud. The alternative point set is obtained from a point cloud group. The point cloud group is obtained by grouping point cloud points on the basis of coordinate code words of the point cloud points. The prediction reference points associated with the target point cloud point are obtained from the obtained alternative point set, so that the spatial correlation between the various point cloud groups can be considered. Therefore, corresponding attribute prediction can be performed on the basis of the spatial correlation between the various point cloud groups, thus improving the accuracy of point cloud prediction. Furthermore, coding and decoding based on this can improve the coding and decoding performance and the coding and decoding efficiency.

This embodiment of this disclosure further provides a computer-readable storage medium, such as a non-transitory computer-readable storage medium. The computer-readable storage medium stores computer-readable instructions suitable for being loaded by a processor and implementing the point cloud prediction processing method in the various steps in FIG. 3 or FIG. 6. For details, please refer to an implementation manner in the various steps in FIG. 3 or FIG. 6, which will not be repeated here. In addition, the description of beneficial effects of the same method is not described herein again. For technical details not disclosed in this embodiment of the computer-readable storage medium in this disclosure, refer to the description of the method embodiment of this disclosure. As an example, the computer-readable instructions may be deployed on one computer device for execution, or on a plurality of computing devices located at one site, or on a plurality of computing devices distributed at a plurality of sites and interconnected by a communication network.

The computer-readable storage medium may be the point cloud prediction processing apparatus provided in any of the aforementioned embodiments or an internal storage unit of the computer device, for example, a hard disk or an internal memory of the computer device. The computer-readable storage medium may also be an external storage device of the computer device, for example, a plug-in hard disk, a smart media card (SMC), a secure digital (SD) card, a flash card, and the like provided on the computer device. Further, the computer-readable storage medium may also include both an internal storage unit and an external storage device of the computer device. The computer-readable storage medium is configured to store the computer-readable instructions and other programs and data required by the computer device. The computer-readable storage medium may also be configured to temporarily store data that has been or is about to be output.

The embodiments of this disclosure further provide a computer-readable instruction product or a computer-readable instruction. The computer-readable instruction product or the computer-readable instruction includes computer-readable instructions stored in a computer-readable storage medium. A processor of a computer device reads the computer-readable instructions from the computer-readable storage medium. The processor executes the computer-readable instructions to cause the computer device to implement the method in the various optional manners in FIG. 3 or FIG. 6. Coding or decoding can be performed on the basis of the target predicted attribute value, that is, coding and decoding are performed on a point cloud. The alternative point set is obtained from a point cloud group. The point cloud group is obtained by grouping point cloud points on the basis of coordinate code words of the point cloud points. The prediction reference points associated with the target point cloud point are obtained from the obtained alternative point set, so that the spatial correlation between the various point cloud groups can be considered. Therefore, corresponding attribute prediction can be performed on the basis of the spatial correlation between the various point cloud groups, thus improving the accuracy of point cloud prediction. Furthermore, coding and decoding based on this can improve the coding and decoding performance and the coding and decoding efficiency.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The above describes only exemplary embodiments of this disclosure and are not, of course, intended to limit the scope of this disclosure. Other embodiments shall fall within the scope of this disclosure.

What is claimed is:

1. A method for point cloud prediction processing, the method comprising:

obtaining an alternative point set of a target point cloud group from M point cloud groups, the M point cloud groups including the target point cloud group, coordinate code words of point cloud points in each of the M point cloud groups being identical after shifting by a grouping shift bit number corresponding to the respective point cloud group;

obtaining prediction reference points associated with a target point cloud point of the point cloud points in the target point cloud group from the alternative point set; and predicting, by processing circuitry, the target point cloud point based on the prediction reference points, to obtain a target predicted attribute value of the target point cloud point, wherein when a mean value of quantities of the point cloud points respectively contained in $M_1$ neighboring point cloud groups adjacent to the target point cloud group is greater than a first point quantity threshold, the grouping shift bit number corresponding to the target point cloud group is less than the grouping shift bit numbers corresponding to the $M_1$ neighboring point cloud groups;

when the mean value of the quantities of the point cloud points contained in the $M_1$ neighboring point cloud groups adjacent to the target point cloud group is less than a second point quantity threshold, the grouping shift bit number corresponding to the target point cloud group is greater than the grouping shift bit numbers corresponding to the $M_1$ neighboring point cloud groups;

$M_1$ is a subset of M; and the first point quantity threshold is greater than the second point quantity threshold.

2. The method according to claim 1, wherein the grouping shift bit number corresponding to each of the M point cloud groups is a respective default grouping shift bit number.

3. The method according to claim 1, wherein the alternative point set includes at least one point cloud group of the M point cloud groups that is located in front of the target point cloud group and adjacent to the target point cloud group; and a total quantity of the point cloud points included in the alternative point set is less than or equal to a third point quantity threshold.

4. The method according to claim 1, wherein the alternative point set includes a plurality of point cloud groups of the M point cloud groups that are located in front of the target point cloud group; and a quantity of the point cloud points included in each of the point cloud groups located in front of the target point cloud group is greater than or equal to an in-group point quantity threshold.

5. The method according to claim 1, wherein the alternative point set includes N point cloud groups of the M point cloud groups, the N point cloud groups being located in front of the target point cloud group, N being equal to a default neighboring group threshold; and the default neighboring group threshold is a quantity threshold of the point cloud groups located in front of the target point cloud group and adjacent to the target point cloud group.

6. The method according to claim 1, wherein each of the M point cloud groups corresponds to a respective point cloud group sequence;

the point cloud group sequence of each of the M point cloud groups is obtained after shifting, according to the grouping shift bit number of the respective point cloud group, the coordinate code words of the point cloud points included in the respective point cloud group;

when the grouping shift bit number corresponding to the target point cloud group is a multiple of a coordinate dimension number, an alternative shift sequence obtained after an alternative point cloud group sequence corresponding to the alternative point set is shifted by a first multiple of the coordinate dimension number is identical with a target shift sequence obtained after a target point cloud group sequence corresponding to the target point cloud group is shifted by the first multiple of the coordinate dimension number; and the coordinate dimension number corresponds to a quantity of dimensions corresponding to the coordinate code words of the point cloud points included in each of the M point cloud groups.

7. The method according to claim 6, wherein when the grouping shift bit number corresponding to the target point cloud group is not the multiple of the coordinate dimension number, an alternative shift sequence obtained after the alternative point cloud group sequence corresponding to the alternative point set is shifted by a supplementary dimension number is identical with a target shift sequence obtained after the target point cloud group sequence corresponding to the target point cloud group is shifted by the supplementary dimension number; and the supplementary dimension number corresponds to
   a bit number difference value between a remainder and the coordinate dimension number, the remainder being between the grouping shift bit number corresponding to the target point cloud group and the coordinate dimension number; or
   a sum of the bit number difference value and a second multiple of the coordinate dimension number.

8. The method according to claim 1, wherein
the obtaining the alternative point set includes obtaining at least two alternative point sets; and
the obtaining the prediction reference points comprises:
   selecting d point cloud points respectively from the at least two alternative point sets, and
   determining the d point cloud points separately corresponding to the at least two alternative point sets as the prediction reference points associated with the target point cloud point.

9. The method according to claim 1, wherein
the obtaining the alternative point set includes obtaining at least two alternative point sets; and
the obtaining the prediction reference points comprises:
   selecting d point cloud points respectively from the at least two alternative point sets as candidate point cloud points,
   obtaining first point-to-point distances between the candidate point cloud points and the target point cloud point,
   sequencing the candidate point cloud points based on the first point-to-point distances, and
   obtaining the prediction reference points associated with the target point cloud point from the sequenced candidate point cloud points.

10. The method according to claim 1, wherein
the obtaining the alternative point set includes obtaining at least two alternative point sets; and
the obtaining the prediction reference points comprises:
   obtaining second point-to-point distances between the point cloud points included in the at least two alternative point sets and the target point cloud point,
   sequencing the point cloud points included in the at least two alternative point sets based on the second point-to-point distances, and
   obtaining the prediction reference points associated with the target point cloud point from the sequenced point cloud points included in the at least two alternative point sets.

11. The method according to claim 1, wherein
the obtaining the alternative point set includes obtaining at least two alternative point sets; and
the obtaining the prediction reference points comprises:
   obtaining set priorities corresponding to the at least two alternative point sets,
   sequencing the at least two alternative point sets based on the set priorities, and
   obtaining P prediction reference points associated with the target point cloud point from the at least two sequenced alternative point sets.

12. The method according to claim 1, wherein the predicting the target point cloud point comprises:
   obtaining prediction reference coordinates of the prediction reference points;
   obtaining a target coordinate of the target point cloud point;
   determining reference weights of the prediction reference points based on coordinate distances between the prediction reference coordinates and the target coordinate;
   obtaining reference attribute reconstruction values of the prediction reference points; and
   performing weighting processing based on the reference attribute reconstruction values and the reference weights, to obtain the target predicted attribute value of the target point cloud point.

13. The method according to claim 1, further comprising:
   obtaining a target actual attribute value of the target point cloud point;
   obtaining a target attribute residual of the target point cloud point based on a difference value between the target actual attribute value and the target predicted attribute value of the target point cloud point; and
   performing a quantization transform on the target attribute residual, to obtain a target transformation coefficient of the target point cloud point, the target point cloud point being coded based on the target transform coefficient.

14. The method according to claim 12, further comprising:
   obtaining transformation coefficients of the point cloud points included in the target point cloud group, and
   coding the transformation coefficients of the point cloud points included in the target point cloud group, to obtain a target code stream corresponding to the target point cloud group.

15. The method according to claim 12, further comprising:
   obtaining a group quantity limit threshold,
   obtaining, based on the group quantity limit threshold, g to-be-coded point cloud groups containing the target point cloud group,
   obtaining transformation coefficients of the point cloud points included in the g to-be-coded point cloud groups, and
   coding the transformation coefficients of the point cloud points included in the g to-be-coded point cloud groups, to obtain group code streams corresponding to the g to-be-coded point cloud groups, g being less than or equal to the group quantity limit threshold.

16. The method according to claim 1, further comprising:
   obtaining a code stream corresponding to the target point cloud point;

decoding the code stream corresponding to the target point cloud point to obtain a target attribute residual of the target point cloud point; and determining a target attribute reconstruction value of the target point cloud point based on the target predicted attribute value and the target attribute residual.

17. The method according to claim 16, wherein the decoding the code stream comprises:

decoding the code stream corresponding to the target point cloud point to obtain a target transformation coefficient of the target point cloud point; and performing an inverse transformation on the target transformation coefficient to obtain the target attribute residual of the target point cloud point.

18. A point cloud prediction processing apparatus, comprising:

processing circuitry configured to:

obtain an alternative point set of a target point cloud group from M point cloud groups, the M point cloud groups including the target point cloud group, coordinate code words of point cloud points in each of the M point cloud groups being identical after shifting by a grouping shift bit number corresponding to the respective point cloud group;

obtain prediction reference points associated with a target point cloud point of the point cloud points in the target point cloud group from the alternative point set; and predict the target point cloud point based on the prediction reference points, to obtain a target predicted attribute value of the target point cloud point, wherein when a mean value of quantities of the point cloud points respectively contained in $M_1$ neighboring point cloud groups adjacent to the target point cloud group is greater than a first point quantity threshold, the grouping shift bit number corresponding to the target point cloud group is less than the grouping shift bit numbers corresponding to the $M_1$ neighboring point cloud groups;

when the mean value of the quantities of the point cloud points contained in the $M_1$ neighboring point cloud groups adjacent to the target point cloud group is less than a second point quantity threshold, the grouping shift bit number corresponding to the target point cloud group is greater than the grouping shift bit numbers corresponding to the $M_1$ neighboring point cloud groups;

$M_1$ is a subset of M; and the first point quantity threshold is greater than the second point quantity threshold.

19. A non-transitory computer-readable storage medium storing instructions, which when executed by a processor, cause the processor to perform:

obtaining an alternative point set of a target point cloud group from M point cloud groups, the M point cloud groups including the target point cloud group, coordinate code words of point cloud points in each of the M point cloud groups being identical after shifting by a grouping shift bit number corresponding to the respective point cloud group;

obtaining prediction reference points associated with a target point cloud point of the point cloud points in the target point cloud group from the alternative point set; and predicting the target point cloud point based on the prediction reference points, to obtain a target predicted attribute value of the target point cloud point, wherein when a mean value of quantities of the point cloud points respectively contained in $M_1$ neighboring point cloud groups adjacent to the target point cloud group is greater than a first point quantity threshold, the grouping shift bit number corresponding to the target point cloud group is less than the grouping shift bit numbers corresponding to the $M_1$ neighboring point cloud groups;

when the mean value of the quantities of the point cloud points contained in the $M_1$ neighboring point cloud groups adjacent to the target point cloud group is less than a second point quantity threshold, the grouping shift bit number corresponding to the target point cloud group is greater than the grouping shift bit numbers corresponding to the $M_1$ neighboring point cloud groups;

$M_1$ is a subset of M; and the first point quantity threshold is greater than the second point quantity threshold.

* * * * *